(12) United States Patent
Matsumura et al.

(10) Patent No.: US 10,805,911 B2
(45) Date of Patent: Oct. 13, 2020

(54) TRANSMITTING APPARATUS AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/346,777

(22) PCT Filed: Nov. 1, 2017

(86) PCT No.: PCT/JP2017/039625
§ 371 (c)(1),
(2) Date: May 1, 2019

(87) PCT Pub. No.: WO2018/084210
PCT Pub. Date: May 11, 2018

(65) Prior Publication Data
US 2019/0313398 A1    Oct. 10, 2019

(30) Foreign Application Priority Data

Nov. 2, 2016  (JP) ................................. 2016-215567

(51) Int. Cl.
*H04W 72/04* (2009.01)
*H04L 1/18* (2006.01)
*H04L 27/26* (2006.01)

(52) U.S. Cl.
CPC ....... *H04W 72/0413* (2013.01); *H04L 1/1861* (2013.01); *H04L 27/26* (2013.01); *H04L 27/2607* (2013.01); *H04W 72/04* (2013.01)

(58) Field of Classification Search
CPC ............. H04W 72/0413; H04L 1/1861; H04L 27/2607
See application file for complete search history.

(56) References Cited

U.S. PATENT DOCUMENTS

| 2008/0298433 | A1* | 12/2008 | Tiirola | H04L 27/2613 |
| | | | | 375/132 |
| 2014/0301324 | A1* | 10/2014 | Cheng | H04L 1/1861 |
| | | | | 370/329 |
| 2016/0191220 | A1* | 6/2016 | Noh | H04L 1/1893 |
| | | | | 370/329 |

FOREIGN PATENT DOCUMENTS

WO    2016158537 A1    10/2016

OTHER PUBLICATIONS

International Search Report Issued in PCT/JP2017/039625 dated Jan. 23, 2018 (2 Pages).
Witten Opinion of the International Searching Authority issued in PCT/JP2017/039625 dated Jan. 23, 2018 (4 Pages).

(Continued)

*Primary Examiner* — Jamal Javaid
(74) *Attorney, Agent, or Firm* — Osha Liang LLP

(57) ABSTRACT

The present invention is designed so that control information for a receiving apparatus can be reported properly in the UL/DL of future radio communication systems. A transmitting apparatus, according to the present invention, has a control section that controls generation of a reference signal using an amount of phase rotation and/or a base sequence that are associated with control information for a receiving apparatus, and a transmission section that transmits the reference signal.

11 Claims, 28 Drawing Sheets

(56) References Cited

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 Pages).
Extended European Search Report issued in the counterpart European Patent Application No. 178669123, dated May 27, 2020 (7 pages).
LG Electronics; "Discussion on sPUCCH for HARQ-ACK in latency reduction"; 3GPP TSG RAN WG1 Meeting #85, R1-164545; Nanjing, China, May 23-27, 2016 (8 pages).

* cited by examiner

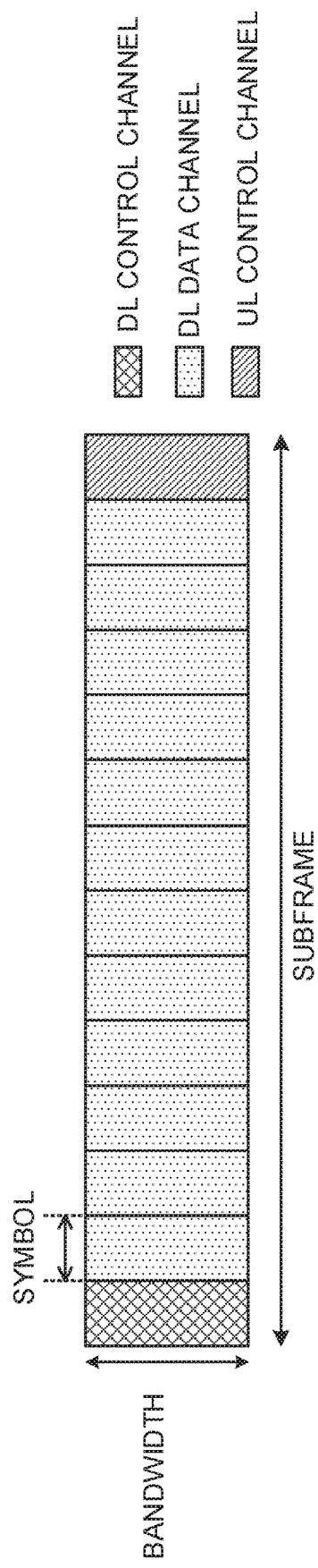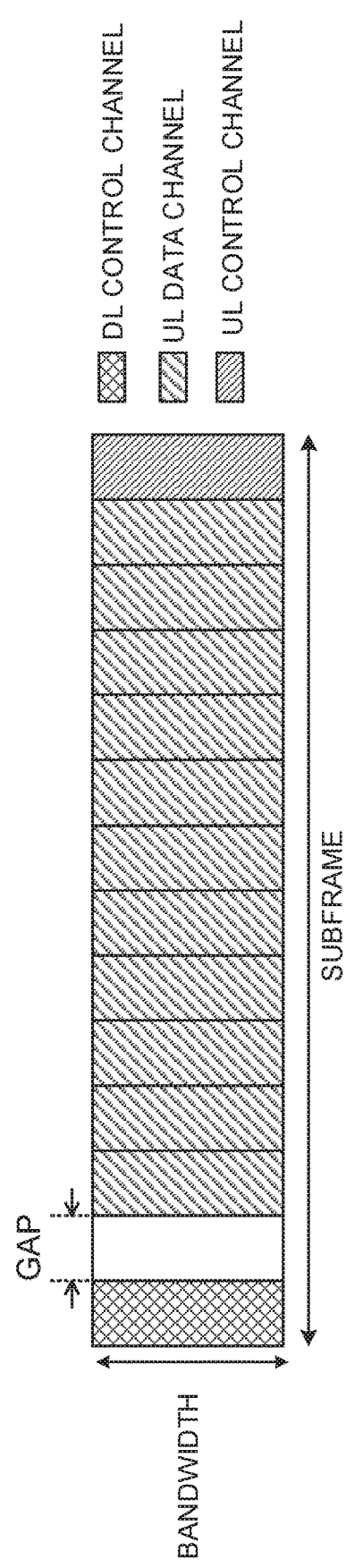

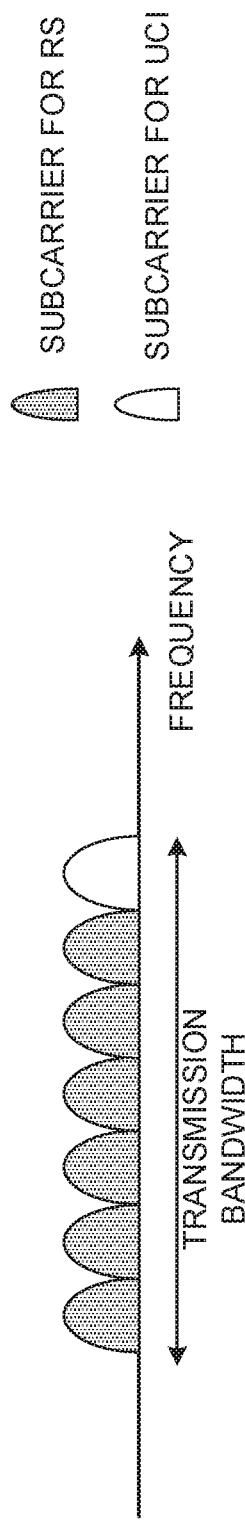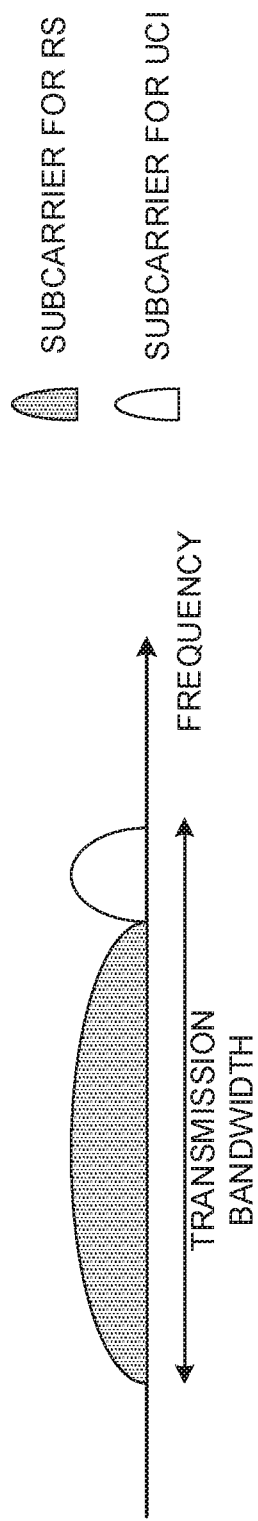

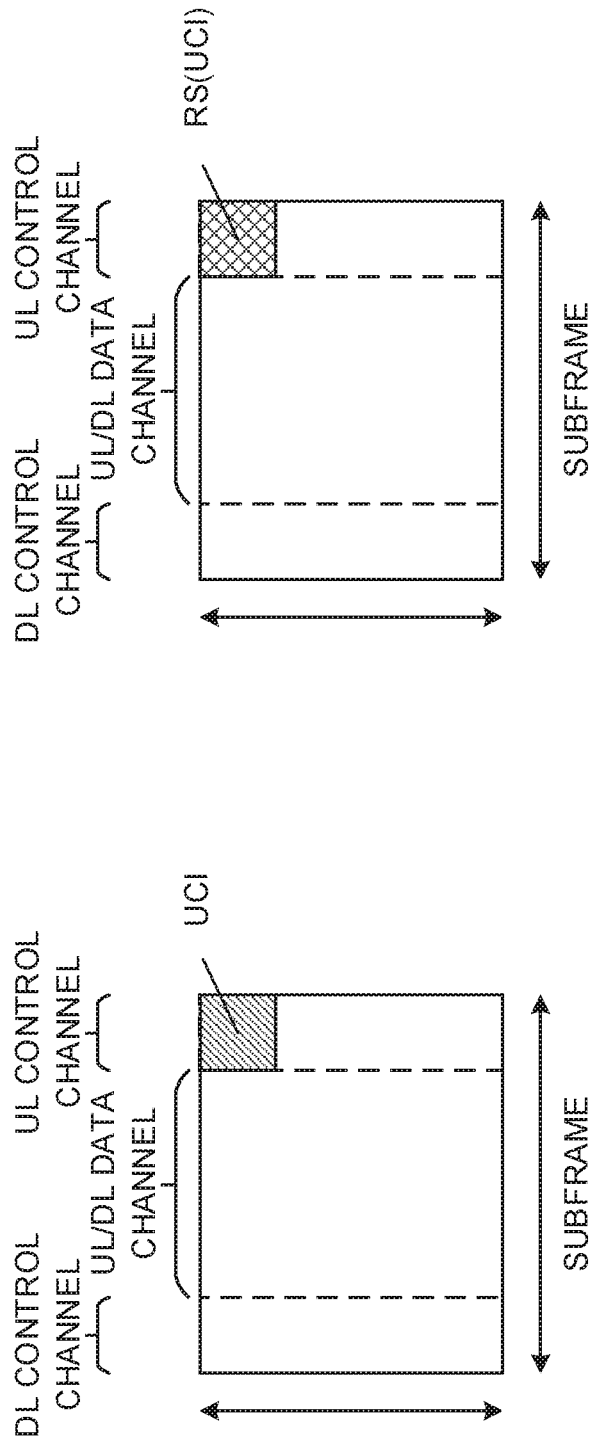

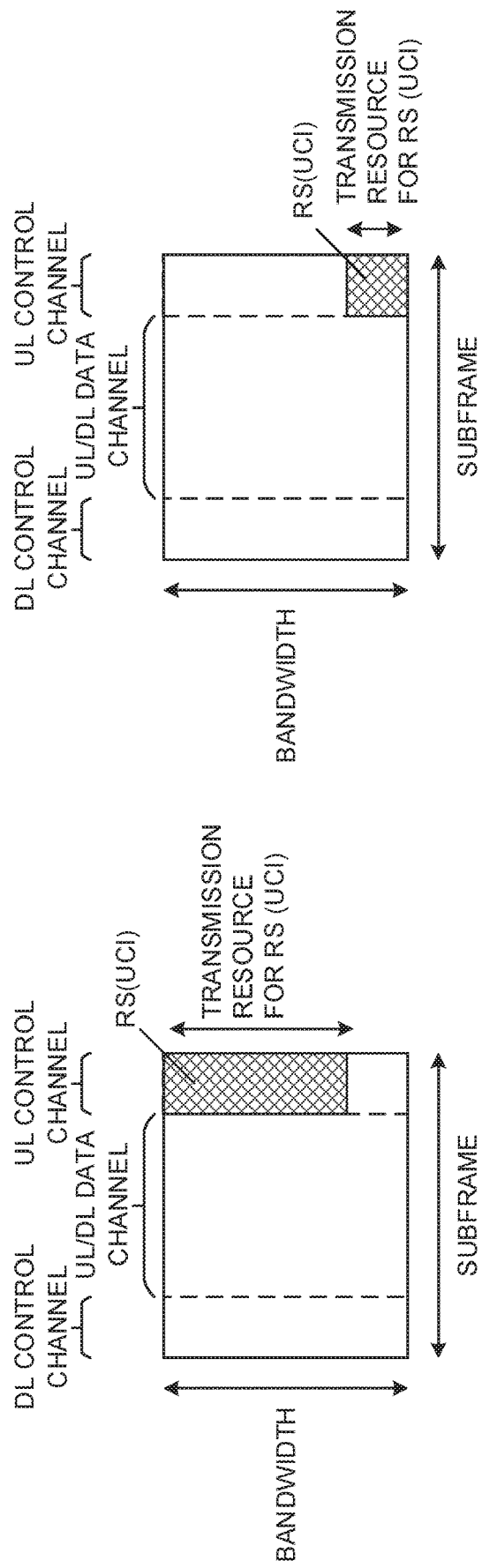

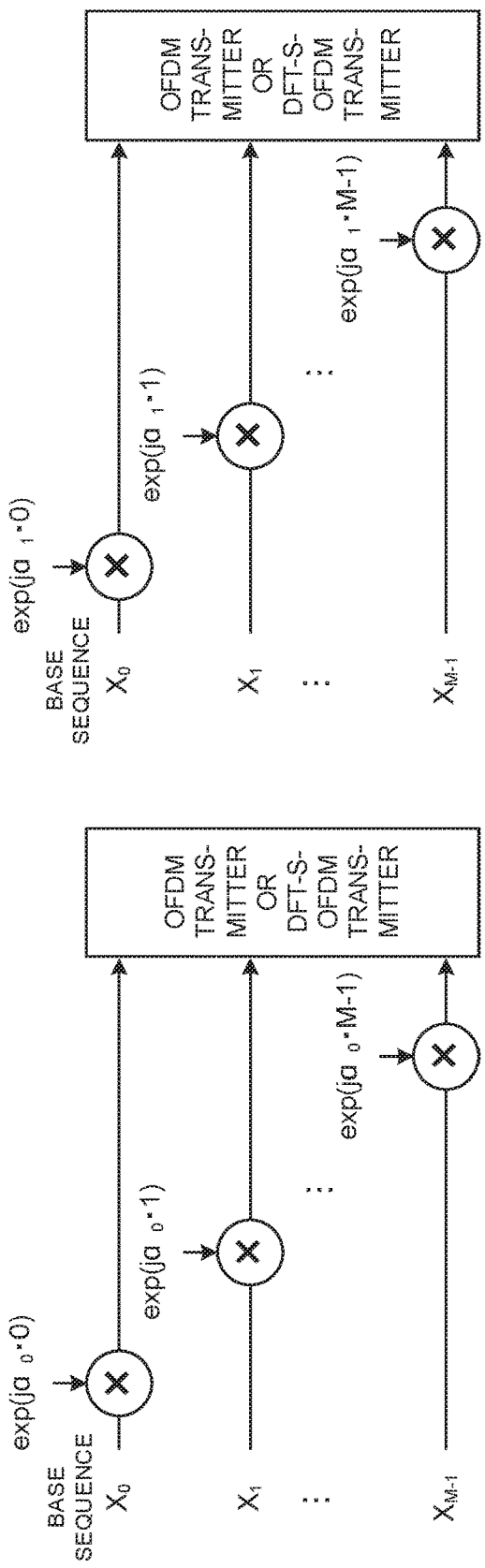
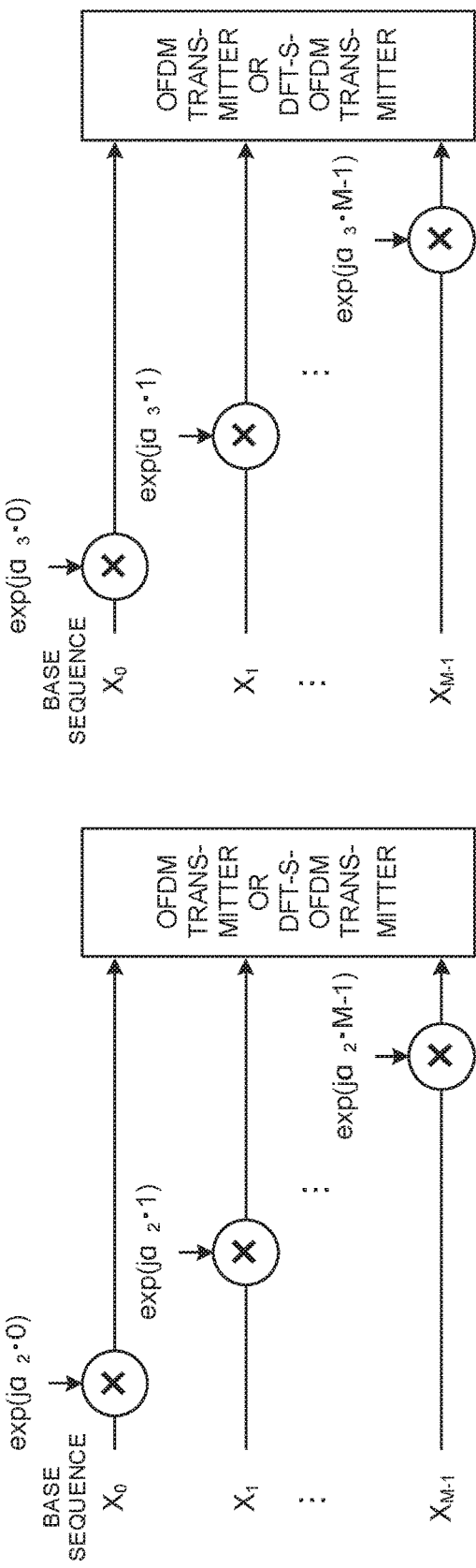
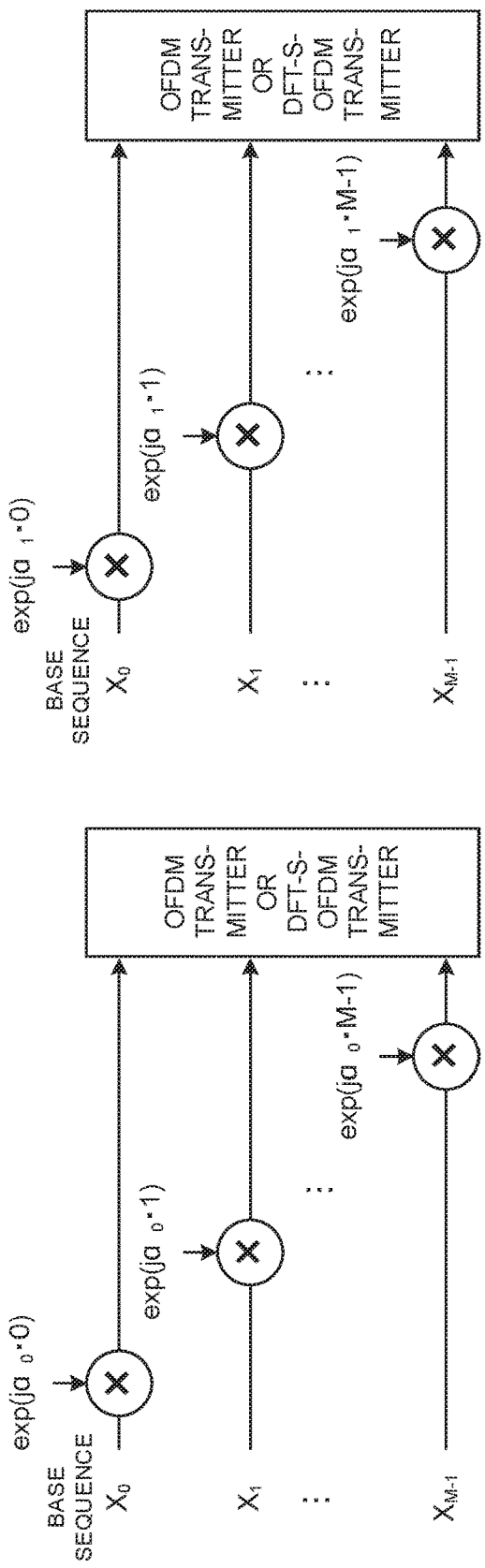
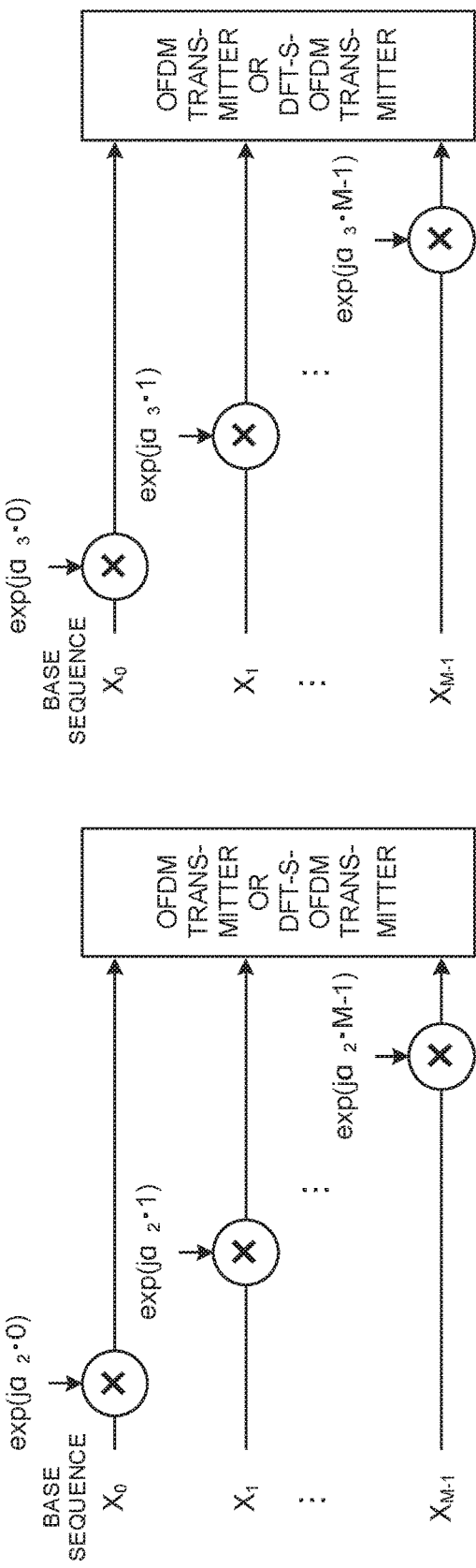

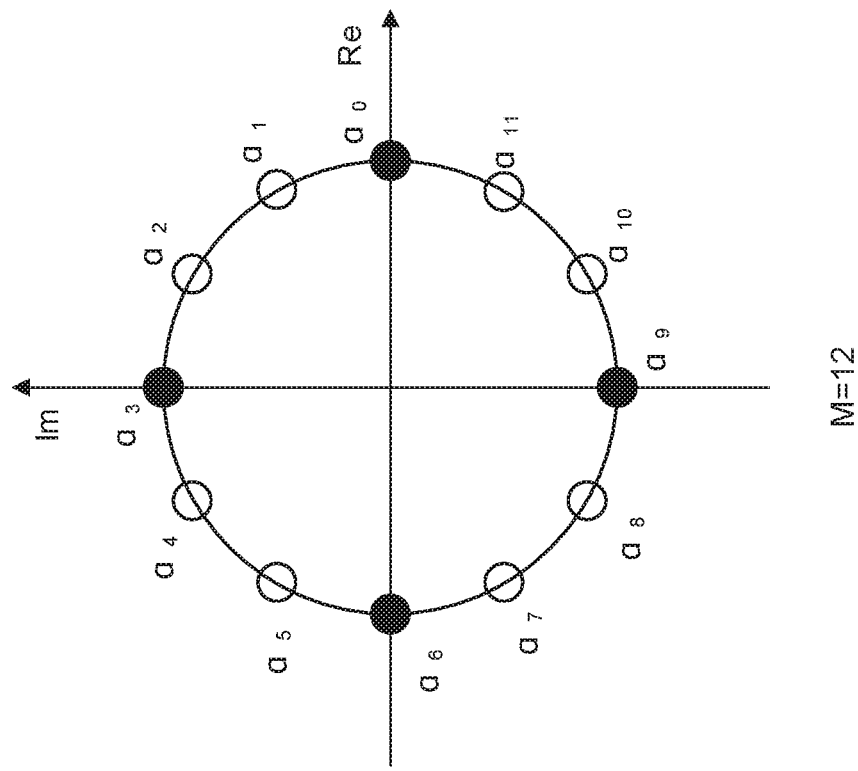

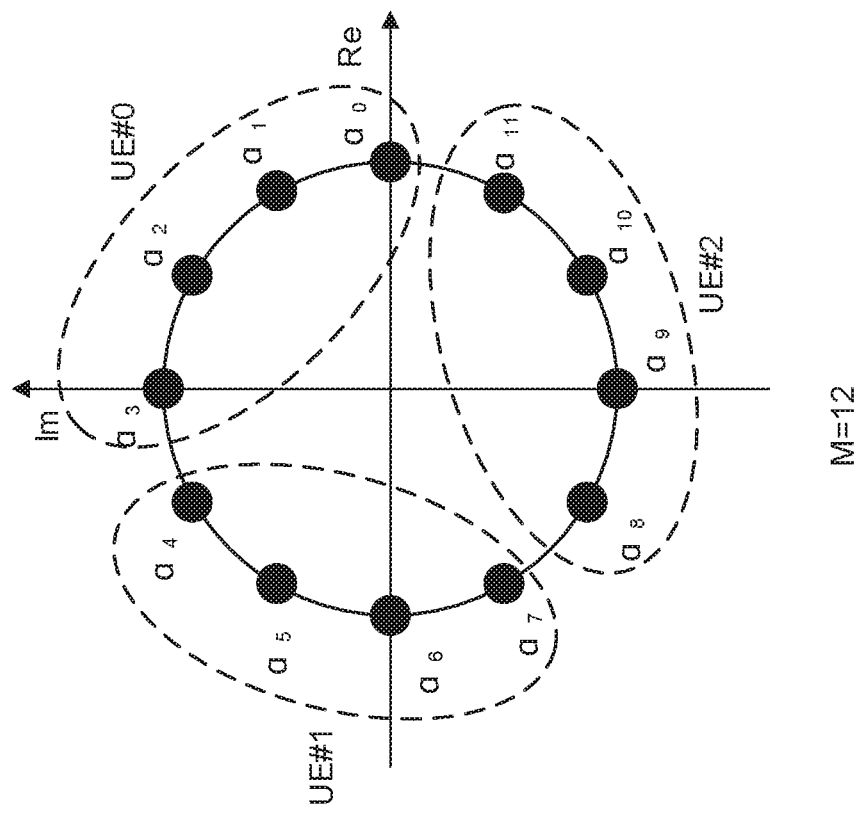

| UCI | PHASE ROTATION AMOUNT |
|---|---|
| 0 | $a_{m+0}$ |
| 1 | $a_{m+1}$ |
| 2 | $a_{m+2}$ |
| ⋮ | ⋮ |
| $2^k-1$ | $a_{m+(2^k-1)}$ |

FIG. 12

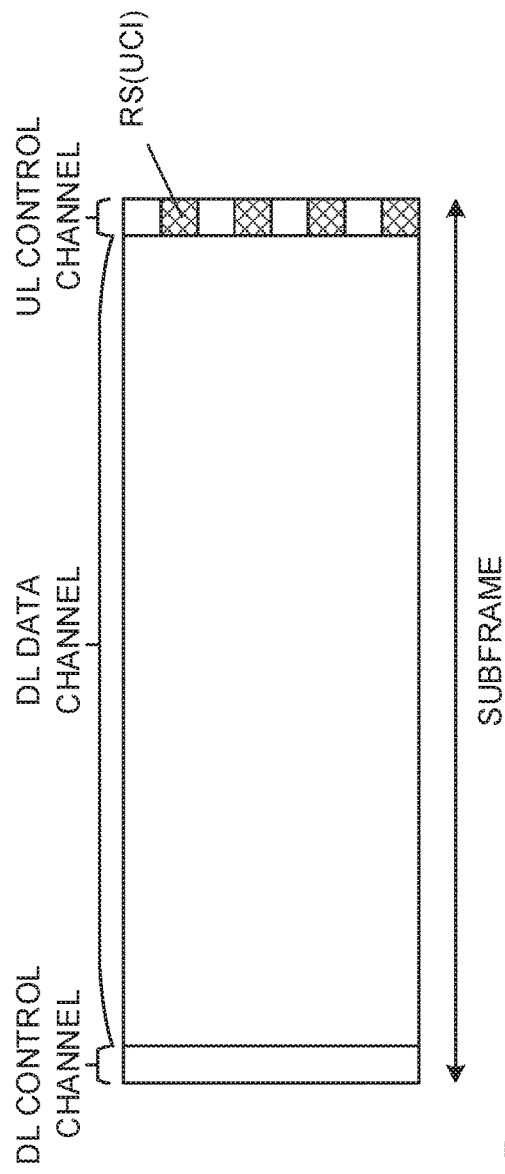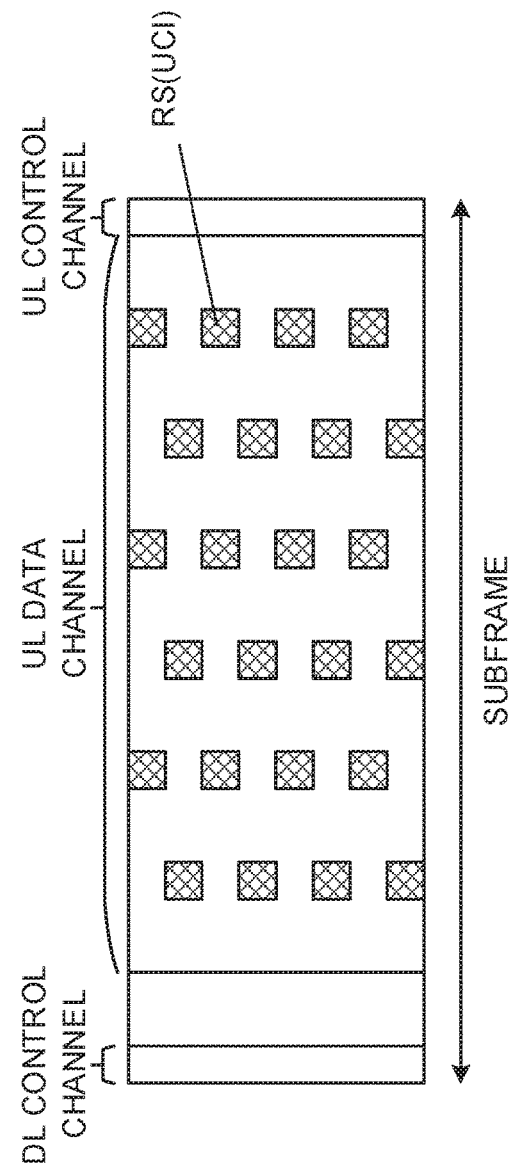

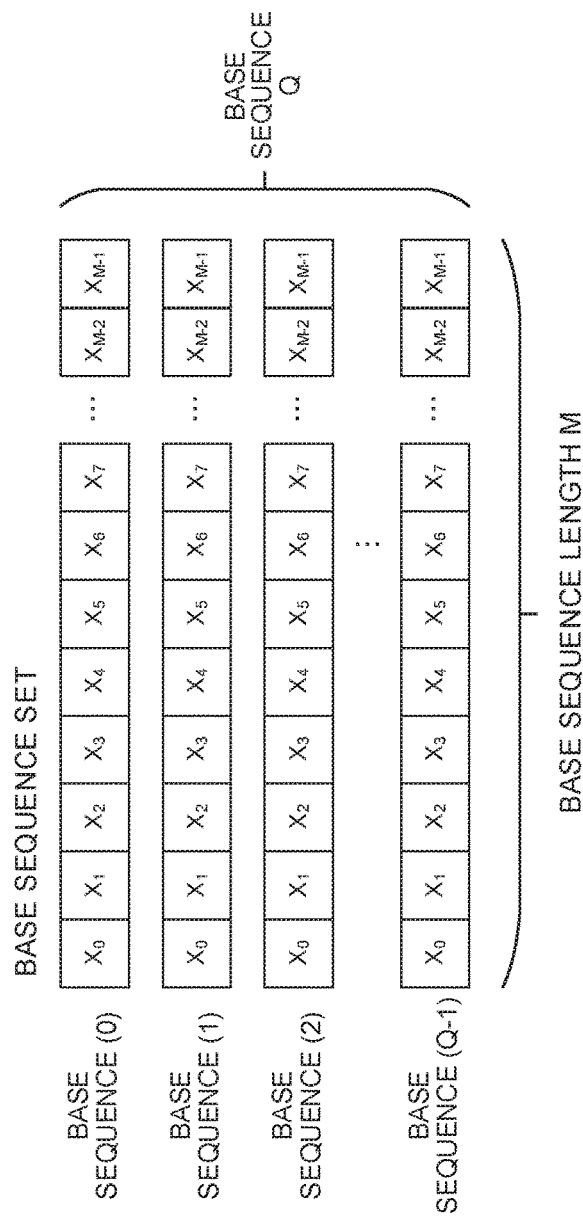

| UCI | BASE SEQUENCE SET | PHASE ROTATION AMOUNT SET |
|---|---|---|
| | BASE SEQUENCE | PHASE ROTATION AMOUNT |
| 0 | BASE SEQUENCE (0) | α m0 |
| 1 | ... | α m0 |
| Q-1 | BASE SEQUENCE (Q-1) | α m0 |
| ... | ... | ... |
| (Q-1)×2^k-1 | BASE SEQUENCE (Q-1) | α m+(2^k-1) |

FIG. 20

CRC SET

UCI=0 | 0 | 0 | 0 | 0 | 0 | 0 | 0 | 0 |

UCI=1 | 0 | 0 | 0 | 0 | 0 | 0 | 0 | 1 |

UCI=2 | 0 | 0 | 0 | 0 | 0 | 0 | 1 | 1 |

UCI=3 | 0 | 0 | 0 | 0 | 0 | 0 | 1 | 0 |

FIG. 22

TRANSMITTING APPARATUS AND RADIO COMMUNICATION METHOD

TECHNICAL FIELD

The present invention relates to a transmitting apparatus and a radio communication method in next-generation mobile communication systems.

BACKGROUND ART

In the UMTS Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+ (plus)," "NR (New RAT)," "LTE Rel. 14," "LTE Rel. 15 (or later versions)," and so on).

In existing LTE systems (for example, LTE Rel. 8 to 13), downlink (DL) communication and/or uplink (UL) communication are performed using one-ms transmission time intervals (TTIs) (also referred to as subframes and so on). This one-ms TTI is the time unit for transmitting one channel-encoded data packet, and serves as the unit of processing in, for example, scheduling, link adaptation, retransmission control (HARQ (Hybrid Automatic Repeat reQuest)) and so on.

Also, in the DL of existing LTE systems (LTE Rel. 8 to 13), multi-carrier communication is employed. To be more specific, in the DL, orthogonal frequency division multiplexing (OFDM), which frequency-division-multiplexes (FDM Frequency Division Multiplexing)) multiple subcarrier is used.

On the other hand, in the UL of existing LTE systems (LTE Rel. 8 to 13), single-carrier communication is employed. To be more specific, in the UL, DFT-S-OFDM (Discrete Fourier Transform-Spread-Orthogonal Frequency Division Multiplexing) is used. DFT-S-OFDM provides a lower peak-to-average power ratio (PAPR) than OFDM, and therefore is suitable for the UL where user terminals make transmission.

Also, in UL control channel configurations (for example, PUCCH (Physical Uplink Control Channel) formats 1 to 5) supported in existing LTE systems (LTE Rel. 13), all symbols that are available in a subframe (for example, fourteen symbols when a normal cyclic prefix (CP) is used) are used, and frequency hopping is applied in units of slots.

Also, in existing PUCCH formats 1 to 5, uplink control information (UCI) and reference signals (RSs) (for example, the demodulation reference signal (DM-RS) for the UL control channel, the reference signal (SRS (Sounding Reference Signal) for channel state sounding)) are allocated to different symbols in a subframe. That is, in existing PUCCH formats 1 to 5, UCI and RSs are time-division-multiplexed (TDM).

Note that UCI includes at least one of retransmission control information (ACK (ACKnowledgement) or NACK (Negative ACK) (A/N), HARQ-ACK, etc.) in response to the DL data channel (DL data), channel state information (CSI), and a scheduling request (SR). Furthermore, UCI may be transmitted in the UL control channel, or transmitted using a UL data channel (for example, PUSCH (Physical Uplink Shared CHannel)) that is allocated to the user terminal.

CITATION LIST

Non-Patent Literature

Non-Patent Literature 1: 3GPP TS 36.300 Rel. 8 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (for example, LTE Rel. 14, 15 and later versions, 5G NR, etc.) are anticipated to use subframes (also referred to as "slots," "minislots," "subslots," "radio frames," etc.) of different configurations from those of existing LTE systems (LTE Rel. 13 or earlier versions). For example, in this subframe, it is assumed that a UL control channel formed with fewer symbols (for example, minimum one symbol) than in existing PUCCH formats 1 to 5 may be used, or this UL control channel may be time-division-multiplexed with at least one of a DL control channel, a DL data channel and a UL data channel.

If, in such future radio communication systems, a UCI transmission method for use in existing LTE systems (LTE Rel. 13 or earlier versions) is used on an as-is basis, a radio base station may not be able to receive (demodulate, decode, etc.) UCI properly. For example, when an RS and UCI are allocated to different symbols as in existing PUCCH formats 1 to 5, the UL control channel, which is comprised of one symbol, can transmit only one of the RS and the UCI, and it is likely that a user terminal cannot report the UCI to the radio base station adequately. Also, when UCI and an RS are frequency-division-multiplexed in one symbol, there is a risk of problems such as increased UCI error rates and/or increased PAPR. Similar problems can also occur in the DL.

Therefore, for the UL/DL, of future radio communication systems, a method is in demand that allows a transmitting apparatus (a user terminal in the UL, the network in the DL (for example, a radio base station), etc.) to report control information for a receiving apparatus (the network in the UL (for example, a radio base station), a user terminal in the DL, etc.) properly.

The present invention has been made in view of the above, and it is therefore an object of the present invention to provide a transmitting apparatus and a radio communication method, whereby control information for a receiving apparatus can be reported properly in the UL/DL of future radio communication systems.

Solution to Problem

In accordance with one aspect of the present invention, a transmitting apparatus has a control section that controls generation of a reference signal using an amount of phase rotation and/or a base sequence that are associated with control information for a receiving apparatus, and a transmission section that transmits the reference signal.

Advantageous Effects of Invention

According to the present invention, it is possible to report control information for a receiving apparatus properly in the UL/DL of future radio communication systems.

BRIEF DESCRIPTION OF DRAWINGS

FIGS. 1A and 1B are diagrams to show examples of possible subframe configurations in future radio communication systems;

FIGS. 2A and 2B are diagrams to show examples of frequency division multiplexing of UCI and an RS in one symbol;

FIGS. 5A and 5B are diagrams to show examples of UCI reporting processes in accordance with the first aspect;

FIGS. 6A and 6B are diagrams to show examples of RS transmission resources according to the first aspect;

FIGS. 9A to 9D are diagrams to show other examples of operations of generating RSs based on the amount of phase rotation, according to the second aspect;

FIGS. 10A and 10B are diagrams to show a second example of a set of amounts of phase rotation according to the second aspect;

FIGS. 11A and 11B are diagrams to show a first example of the method of multiplexing user terminals, according to the second aspect;

FIG. 12 is a diagram to show an example of reporting a set of amounts of phase rotation, according to the second aspect;

FIGS. 14A and 14B provide diagrams to show other examples of subframe configurations according to the second aspect;

FIGS. 18A and 18B are diagrams to show examples of base sequence sets, according to the second aspect;

FIG. 20 is a diagram to show examples of associations between UCI, a set of base sequences and a set of amounts of phase rotation, according to the second aspect;

FIG. 22 is a diagram to show an example of a CRC set according to another aspect;

DESCRIPTION OF EMBODIMENTS

Figure 3A:
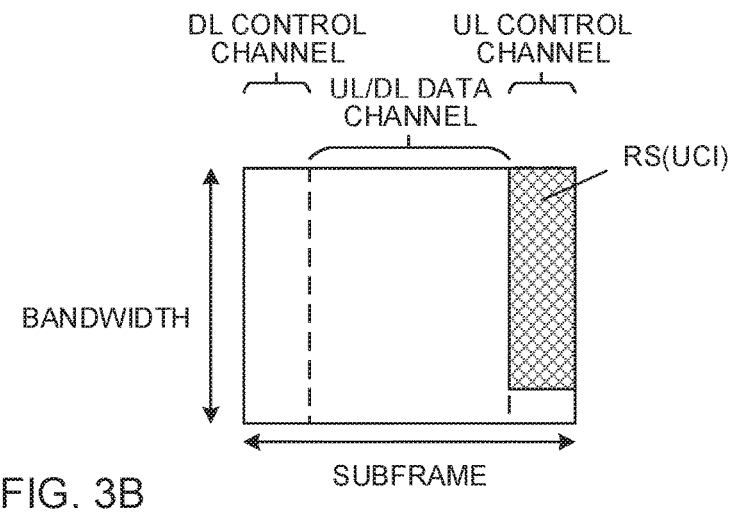
FIGS. 3A to 3C are diagrams to show examples of RSs according to a first aspect of the present invention.

FIG. 1 are diagrams to show examples of possible subframe configurations in future radio communication systems. Note that, a subframe configuration may be referred to as a "subframe structure," a "subframe type," a "frame configuration," a "frame structure," a "frame type," a "slot configuration," a "slot structure," a "slot type," a "subslot configuration," a "minislot configuration," and so on.

For example, FIG. 1A shows a subframe configuration, in which a DL control channel (for example, a PDCCH (Physical Downlink Control CHannel)), a DL data channel (for example, a PDSCH (Physical Downlink Shared CHannel), which is also referred to as a "DL shared channel" and so on), and a UL control channel (for example, a PUCCH) are arranged (this subframe configuration may be referred to as a "DL centric subframe configuration" and/or others). The user terminal controls receipt of the DL data channel based on downlink control information (DCI) that is transmitted in the DL control channel.

In the subframe configuration shown in FIG. 1A, the user terminal can feed back retransmission control information (also referred to as "HARQ-ACK (Hybrid Automatic Repeat reQuest-Acknowledgment)," "ACK" or "NACK" (ACK/NACK, A/N), etc.) pertaining to the DL data channel via the UL control channel in the same time period (also referred to as "NR TDD subframe," "transmission time interval (TTI)," "subframe," etc.). Note that the user terminal may feed back this ACK/NACK in the UL control channel or the UL data channel in a subsequent subframe.

FIG. 1B shows a subframe configuration, in which a DL control channel (for example, a PDCCH), a UL data channel (for example, a "PUSCH (Physical Uplink Shared CHannel)," which is also referred to as a "UL shared channel," and so on) and a UL control channel (for example, a PUCCH) are arranged (this subframe configuration may be referred to as a "UL centric subframe configuration" and/or others). Based on DCI that is transmitted in the DL control channel, the user terminal may transmit the UL data channel (UL data, channel state information (CSI), etc.) in the same subframe. Note that the user terminal may transmit this UL data channel in a subsequent subframe.

The subframes shown in FIGS. 1A and 1B illustrate assignments, in which control (scheduling) of transmission and receipt is completed within the same subframe. This type of assignment is referred to as "self-contained assignment." Also, subframes that are subject to self-contained assignment are referred to as "self-contained subframes," "self-contained TTIs," "self-contained symbol sets" and so on.

In self-contained subframes, the user terminal may receive the DL data channel based on the DL control channel, and transmit an HARQ-ACK in response to the DL data channel. The use of self-contained subframes can realize feedback with ultra-low delay of 1 ms or less, for example, so that the latency can be reduced.

Note that the subframe structures shown in FIGS. 1A and 1B are simply examples, and are by no means limiting. The locations of individual channels can be switched as appropriate, and part of the channels shown in FIGS. 1A and 1B may be placed in subframes. Also, the bandwidths shown in FIGS. 1A and 1B have to include at least the bandwidths allocated to the UL/DL data channels, and need not match the system bandwidth.

Also, although varying channels are time-divided in FIGS. 1A and 1B, the DL control channel and the UL/DL data channel need not be time-multiplexed and may be frequency-multiplexed/code-multiplexed in the same time period (for example, in the same symbol). Likewise, the UL control channel and the UL/DL data channel may not be time-multiplexed and may be frequency-multiplexed/code-multiplexed in the same time period (for example, symbols).

Also, although not illustrated in FIG. 1A, a time to switch from DL to UL (gap period) may be provided between the DL data channel and the UL control channel. Furthermore, although not illustrated in FIGS. 1A and 1B, a time to switch from UL to DL (gap period) may be provided between the UL control channel and the time where the next subframe starts.

Also, in FIG. 1B, a gap period of one symbol is configured between the DL control channel and the UL data channel but this gap period may be two or more symbols, and the number of symbols may not be an integer. Furthermore, the gap period between the UL control channel and the time the next subframe starts is not explicitly shown on the channel configuration, and may be configured, in practical operation, by adjusting the configuration time of timing advance (TA) that is applied to UL signals.

Also, in FIGS. 1A and 1B, the UL/DL control channels are each comprised of one symbol, the UL/DL control channels may be each comprised of a plurality of symbols (for example two or three symbols). When the number of symbols in the UL/DL control channel is configured large, the coverage can be expanded, but the overhead will increase. Therefore, in order to prevent an increase in overhead, it may be possible to configure the UL/DL control channel with, for example, a minimum of one symbol.

Now, UL control channels (PUCCH formats 1 to 5) of existing LTE systems are transmitted in all symbols that are available in a subframe (for example, fourteen symbols when a normal cyclic prefix (CP) is used (or thirteen symbols when SRS is transmitted)). In addition, in existing PUCCH formats 1 to 5, a specific symbol in a subframe is used exclusively for a reference signal (for example, DM-RS).

However, there is a possibility that the method of multiplexing UCI and a reference signal (RS) according to existing PUCCH formats 1 to 5 cannot be applied to the UL control channels exemplified in FIGS. 1A and 1B, which are comprised of a minimum of one symbol. In existing PUCCH formats 1 to 5, a specific symbol is used exclusively for an RS, and, to multiplex UCI and an RS, at least two symbols are required (or at least four symbols if frequency hopping is applied). By contrast with this, in future radio communication systems, a UL control channel may be formed with a minimum of one symbol, and therefore existing PUCCH formats 1 to 5 cannot be applied.

As a method of multiplexing the UCI and the RS in one symbol, it is assumed that the UCI and the RS are frequency-division-multiplexed using a plurality of subcarriers (or carriers).

FIG. 2 are diagrams to show examples of frequency division multiplexing of UCI and an RS in one symbol. FIG. 2A shows an example of multi-carrier communication (for example, OFDM), and FIG. 2B shows an example of single-carrier communication (for example, DFT-S-OFDM). Single-carrier communication is excellent in transmission power efficiency, and therefore is anticipated to be used in future radio communication systems (for example in high frequency bands or UL).

As shown in FIG. 2A, in multi-carrier communication using a plurality of subcarriers, it may be possible to frequency-division-multiplex UCI and an RS in one symbol. In the event the RS is an SRS, it is desirable to transmit the SRS in a band that is as wide as possible, so as to improve the accuracy of channel quality estimation. For example, the SRS is preferably transmitted over the entire band of the UL data channel. The wider the band of the RS, the narrower the band of UCI. Since the maximum transmission power of the user terminal is fixed, the power density of UCI decreases as the band for UCI becomes narrower. As a result of this, the error rate of UCI may increase.

Furthermore, as shown in FIG. 2B, it may be possible to frequency-division-multiplex UCI and an RS by using a number of different carriers in single-carrier communication. As described above, in the event two carriers are transmitted in single-carrier communication, the PAPR may increase and the power efficiency may deteriorate compared to the case where only one carrier is transmitted. In this case, the advantages of single-carrier communication that instantaneous power fluctuation is insignificant and that the PAPR is lower than in multi-carrier communication may be lost.

Therefore, in the UL of future radio communication systems, it is desirable not to frequency-division-multiplex UCI for a radio base station and an RS, and report the UCI properly even when there is a minimum one symbol. Since the same problem can also occur in the DL, in the UL, and/or the DL of future radio communication systems, it is desirable that a transmitting apparatus (a user terminal in the UL, the network in the DL (for example, a radio base station), etc.) does not frequency-division-multiplex control information for a receiving apparatus (the network (for example, a radio base station) in the UL, a user terminal in the DL, etc.) and an RS, and transmits a minimum one symbol.

So, in accordance with one aspect of the present embodiment, the present inventors have come up with the idea of associating predetermined parameters (for example, the amount of phase rotation and/or the base sequence) that are used to generate RSs of a minimum one symbol, with control information that is reported to a receiving apparatus, and reporting the control information to the receiving apparatus, implicitly, by transmitting RSs that are generated using these predetermined parameters. By this means, the transmitting apparatus can report control information to the receiving apparatus only by transmitting these RSs in a minimum one symbol, without frequency-division-multiplexing the control information for the receiving apparatus and the RS.

Now, the present embodiment will be described below in detail. Note that cases will primarily be described below in which the amount of phase rotation and/or the base sequence for an RS serve as predetermined parameters that are associated with control information for a receiving apparatus, the predetermined parameters are not limited to these. For example, these predetermined parameters may be the spreading code for use for generating data, the CRC (Cyclic Redundancy Check) sequence, and/or others.

Also, the present embodiment can be applied to single-carrier communication using DFT-S-OFDM and so on, and/or multi-carrier communication using OFDM and so on. In the UL according to the present embodiment, RSs that are generated using the above-noted predetermined parameters may be at least one of the DM-RS for use for demodulating the UL control channel and/or the UL data channel, and the SRS for use for channel state sounding. Also, RSs that are generated using the above-noted predetermined parameters in the DL may be at least one of the DM-RS, the CSI-RS (Channel State Information-Reference Signal), the CRS (Cell-specific Reference Signal) and so on.

Although examples pertaining to the UL, where a user terminal is the transmitting apparatus and the network (for example, a radio base station) is the receiving apparatus, will be primarily described below, the present invention can also be applied to examples pertaining to the DL, where the radio base station is the transmitting apparatus and a user terminal is the receiving apparatus.

First Aspect

In accordance with a first aspect of the present invention, an example will be described in which a user terminal controls transmission of UCI and/or an RS based on UCI transmission timing and/or RS transmission timing. Here, the UCI is at least one of an A/N in response to DL data, a scheduling request (SR), and channel state information (CSI).

According to the first aspect, the user terminal judges whether or not to transmit an RS, which is generated based on an amount of phase rotation and/or a base sequence associated with UCI (whether or not to multiplex UCI and an RS), based on the timing to transmit the UCI and/or the timing to transmit the RS. To be more specific, when the timing to transmit UCI and the timing to transmit an RS overlap, the user terminal transmits an RS that is generated based on an amount of phase rotation and/or a base sequence associated with UCI (FIG. 3A).

Figure 3B:
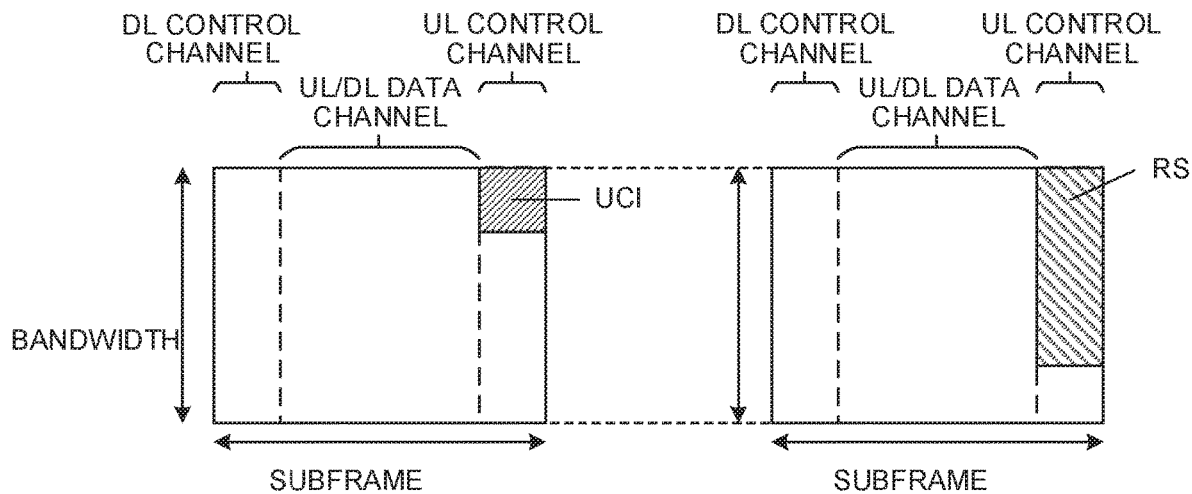

On the other hand, when the timing to transmit UCI and the timing to transmit an RS do not overlap, the user terminal does not have to transmit an RS that is generated based on an amount of phase rotation and/or a base sequence associated with UCI, and may transmit UCI and an RS in separate subframes using an existing method (FIG. 3B).

Figure 3C:
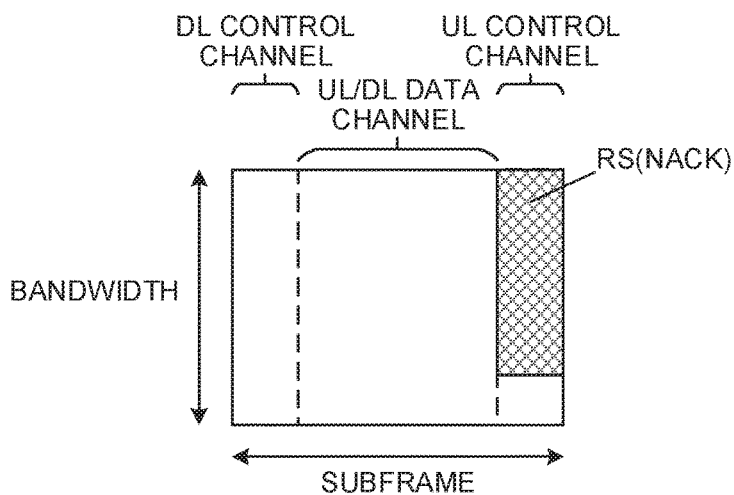

Alternatively, in a similar case, as will be described in detail with reference to FIG. 4, the user terminal may transmit an RS that is generated based on an amount of phase rotation and/or a base sequence associated with UCI, even at a timing that is not an RS transmission timing, as shown in FIG. 3A, so as to report the UCI implicitly. Also, even at a timing that is not an UCI transmission timing, the user terminal may transmit an RS that is generated based on the amount of phase rotation and/or the base sequence associated with a specific candidate value (for example, a NACK) for UCI instead of an existing RS (FIG. 3C).

In the first aspect, the timing for transmitting UCI may be defined in the specification in advance, or may be configured by higher layer signaling and/or physical layer signaling.

For example, the timing for transmitting an A/N may be provided, in advance, a predetermined period after DL data is received.

Also, the timing to transmit an RS may be defined in the specification in advance, or may be configured by higher layer signaling (including broadcast information) and/or physical layer signaling. The RS transmission timing may be periodic or aperiodic. The cycle of transmitting RSs periodically (for example, periodic SRS) may be configured by higher layer signaling. Also, aperiodic transmission of an RS (for example, an aperiodic SRS) may be commanded by a trigger included in DCI.

Figure 4:
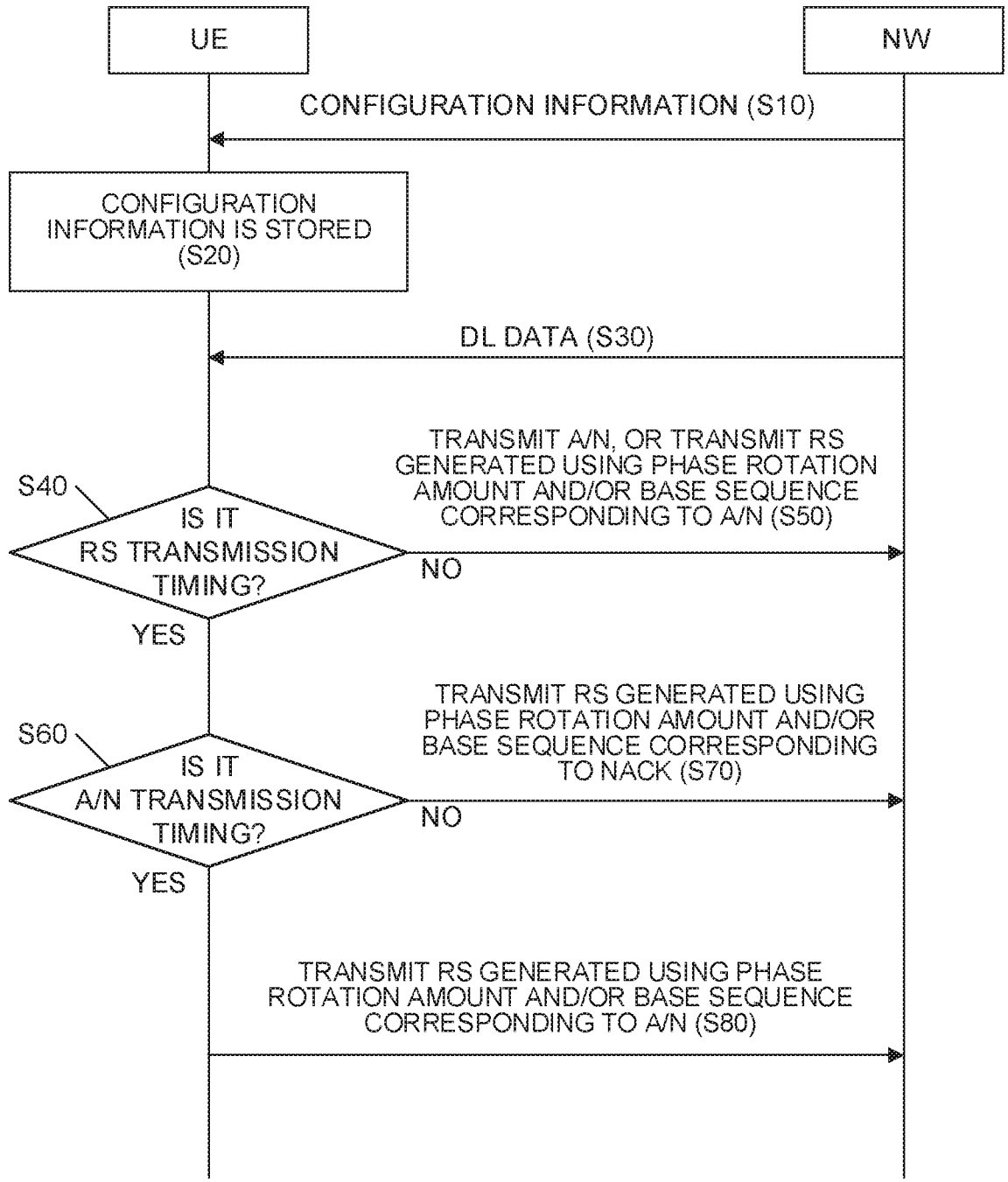
FIG. 4 is a diagram to show an example of transmission control according to the first aspect.

FIG. 4 is a diagram to show an example of transmission control according to the first aspect. This drawing shows a sequence diagram to show the operation of a user terminal (UE) and a network (NW) (for example, a radio base station (also referred to as an "eNB (eNode B)," "gNB (gNode B)," and so on). In FIG. 4, the UCI is an A/N, but this is not limiting, and an SR and/or others may be included. In addition, with FIG. 4, a case will be described where the amount of phase rotation and/or the base sequence for an RS are associated with UCI as predetermined parameters.

As shown in FIG. 4, the user terminal receives, from the network (for example, a radio base station), configuration information that is necessary when reporting UCI in an implicit manner by using the amount of phase rotation and/or the base sequence for an RS (step S10), and stores the configuration information (step S20). Note that the configuration information is assumed to be transmitted by higher layer signaling, but this is by no means limiting, and may be transmitted by higher layer signaling and/or physical layer signaling.

Here, the configuration information may be information that associates the value of UCI with the amount of phase rotation and/or the base sequence for an RS. For example, the configuration information may be a set of information that associates a plurality of candidate values for UCI values, with a plurality of candidate values for amounts of phase rotation for RSs and/or base sequences, respectively. Note that steps S10 and S20 in FIG. 4 may be omitted, and the above configuration information may be stored in advance in the user terminal.

Also, as shown in FIG. 4, the user terminal receives DL data from the network and generates an A/N in response to the DL data (step S30). The user terminal judges whether or not the present subframe provides a timing for transmitting an RS (step S40).

If the user terminal judges that the present subframe is not the timing for transmitting an RS ("NO" in step S40), the user terminal may transmit (explicitly report) an A/N per se in response to the DL data received in step S30 (FIG. 3B), or the user terminal may report an A/N implicitly by transmitting an RS that is generated by using the amount of phase rotation and/or the base sequence associated with that A/N (FIG. 3A) (step S50).

If the user terminal judges that the present subframe provides a timing for transmitting an RS ("YES" in S40), the user terminal judges whether or not the present subframe provides a timing for transmitting an A/N (S60).

If the user terminal judges that the present subframe provides a timing for transmitting an RS but provides no timing for transmitting an A/N ("YES" in step S40 and/or "NO" in step S60), the user terminal transmits an RS that is generated by using a specific amount of phase rotation and/or base sequence (FIG. 3C) (step S70), and ends this sequence. For example, as shown in FIG. 3C, the specific amount of phase rotation and/or base sequence may be an amount of phase rotation and/or a base sequence associated with a NACK.

When the user terminal judges that the present subframe provides a timing for transmitting an RS and a timing for transmitting an A/N ("YES" in step S40 and/or "YES" in step S60), the user terminal generates an RS using the amount of phase rotation and/or the base sequence corresponding A/N for the DL data received in step 30, transmits this RS (FIG. 3A) (step S80), and ends this sequence.

According to FIG. 4, even when the timing for transmitting an A/N and the timing for transmitting an RS overlap, the user terminal transmits an RS that is generated based on the amount of phase rotation and/or the base sequence associated with the A/N. Therefore, even if the user terminal does not transmit the A/N in an explicit manner, the radio base station can still identify the A/N from the user terminal based on the amount of phase rotation and/or the base sequence applied to the RS. Therefore, it is possible to report an A/N properly by using a minimal number of symbols without frequency-division-multiplex (FDM) an RS and an A/N.

Now, with reference to FIG. 5, the process of reporting UCI (for example, an A/N) (for example, S50 of FIG. 4) in the event the timing for transmitting UCI and the timing for transmitting an RS do not overlap will be described in detail. FIG. 5 are diagrams to show examples of the UCI reporting process according to a first aspect.

FIG. 5A shows a case where UCI is transmitted alone (a case similar to FIG. 3B). In the case of FIG. 5A, the user terminal may encode and modulate the UCI and transmit this. In this case, transmission can be made using a method with better error characteristics such as error correction coding, so that the error rate of A/Ns can be improved. Also, an A/N may be frequency-division-multiplexed with the DM-RS for use for demodulating the A/N.

FIG. 5B shows a case where an RS is generated based on an amount of phase rotation and/or a base sequence associated with UCI, and where the UCI is reported implicitly by transmitting this RS (a case similar to FIG. 3A). In the case of FIG. 5B, it is possible to transmit an RS irrespective of whether or not a timing for transmitting an RS is provided (that is, in either case of "YES" "NO" in step 40 of FIG. 4) so that the operation of the user terminal can be simplified.

Now, with reference to FIG. 6, transmission resources for RSs generated based on amounts of phase rotation and/or base sequences associated with UCI will be explained. FIG. 6 provide diagrams to show examples of transmission resources for RSs according to the first aspect.

FIG. 6A shows an example of a transmission resource for an RS that is transmitted at an RS transmission timing (for example, the RS transmitted in S70 or S80 of FIG. 4). Meanwhile, FIG. 6B shows an example of a transmission resource for an RS that is transmitted at a timing different from an RS transmission timing (for example, the RS transmitted in S50 of FIG. 4).

As shown in FIG. 6A, when an RS is transmitted based on an amount of phase rotation and/or a base sequence associated with UCI (for example, S70 and S80 of FIG. 4) at a timing for transmitting an RS (for example, an SRS), this RS may be used for channel state sounding. For this reason, it is desirable that this RS is transmitted using a transmission resource of a wide bandwidth (for example, a band in which a UL data channel can be allocated).

On the other hand, as shown in FIG. 6B, when an RS is transmitted based on an amount of phase rotation and/or a base sequence associated with UCI at a timing different from an RS transmission timing (for example, S50 of FIG. 4), the RS is used only for reporting UCI implicitly, and not used for channel state sounding. Therefore, the RS may be transmitted in a transmission resource of a narrower bandwidth than that of FIG. 6A.

The transmission resource at the RS (for example, SRS) transmission timing shown in FIG. 6A and the transmission resource at the timing shown in FIG. 6B, which is not an RS transmission timing, may be reported per user terminal by way of higher layer signaling and/or physical layer signaling. The user terminal may decide which of the transmission resources shown in FIGS. 6A and 6B to use, based on whether or not an RS transmission timing is provided.

As described above, according to the first aspect, the user terminal transmits an RS that is generated using an amount of phase rotation and/or a base sequence associated with UCI, so that, even if the user terminal does not transmit the UCI explicitly, the radio base station can identify the UCI from the user terminal based on the amount of phase rotation and/or the base sequence applied to the RS. Therefore, the user terminal can properly report UCI by using a minimal number of symbols without frequency-division-multiplexing (FDM) an RS and UCI.

Second Aspect

In accordance with a second aspect of the present invention, the operation in which a user terminal generates an RS using an amount of phase rotation and/or a base sequence associated with UCI will be explained in detail. Note that the amount of phase rotation may also be referred to as the "amount of cyclic shift." Furthermore, as described above, the RS may be a DM-RS, an SRS, or any signal that applies phase rotation to a base sequence. Furthermore, the UCI may be an A/N and/or an SR, for example.

Amount of Phase Rotation

Figures 7A, 7B, 7C:
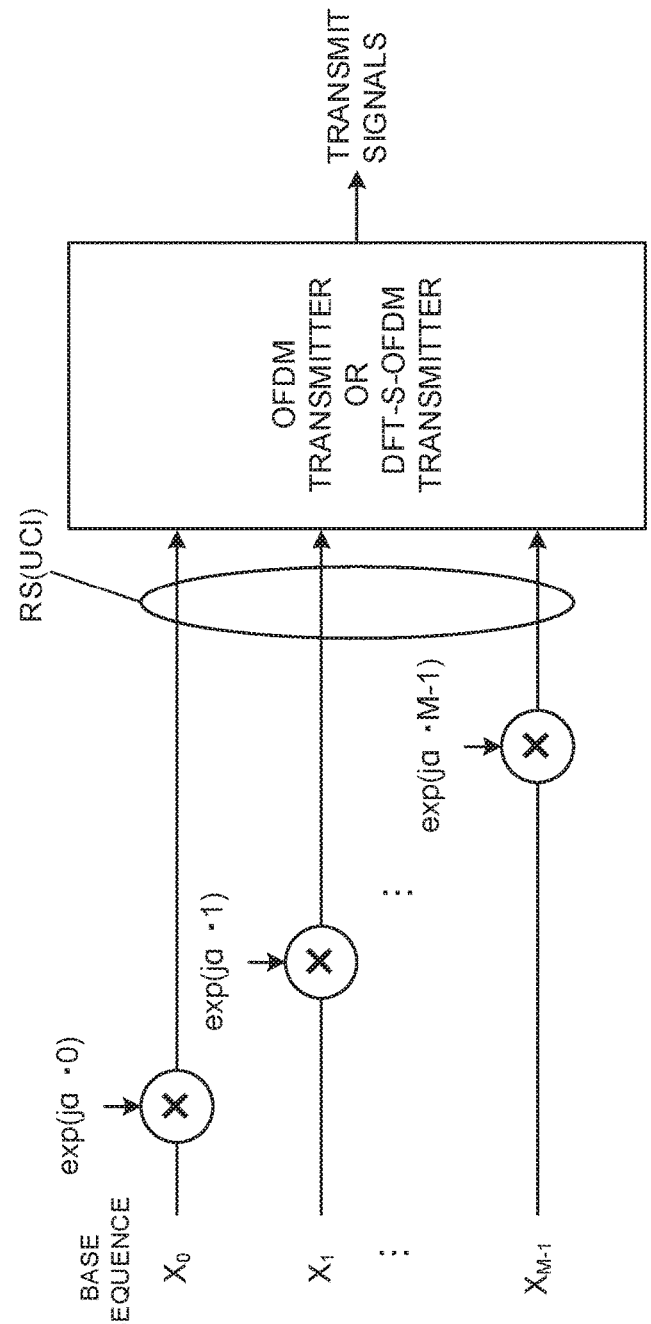
FIGS. 7A to 7C are diagrams to show examples of operations of generating RSs based on the amount of phase rotation, according to a second aspect of the present invention.

With reference to FIG. 7 to FIG. 16, the RS generation operation based on the amount of phase rotation associated with UCI will be explained. FIG. 7 are diagrams to show examples of RS generation operations according to the second aspect. FIGS. 7A and 7B show examples of configuration information that associates UCI and amounts of phase rotation for RSs. As has been described with the first aspect, this configuration information may be reported to the user terminal via higher layer signaling and/or physical layer signaling.

As shown in FIG. 7A, this configuration information may be a set of information that associates a plurality of candidate UCI values (here 0, 1, 2 and 3) and a plurality of amounts of phase rotation (here, $\alpha_0$, $\alpha_1$, $\alpha_2$ and $\alpha_3$) (hereinafter also referred to as a "set of amounts of phase rotation," a "set of phase rotation amounts," a "phase rotation amount set," and so on) that are used to generate RSs. Note that, in a set of information, as shown in FIG. 7B, a plurality of candidate values for UCI that are associated with a plurality of amounts of phase rotation may be represented by a predetermined number (for example, two bits) of bit values using Gray code.

The user terminal selects the amount of phase rotation that corresponds to the UCI to be reported, from the set of phase rotation amounts shown in FIG. 7A. For example, when the user terminal reports the UCI "2" ("11" in the Gray code of FIG. 7B) to the radio base station, the user terminal selects the amount of phase rotation "$\alpha_2$," which is associated with the UCI "2" in FIG. 7A.

FIG. 7C shows an example of the operation of generating an RS using an amount of phase rotation α selected based on UCI. In this RS generation operation, as shown in FIG. 7C, the user terminal applies phase rotation to base sequences $X_0$ to $X_{M-1}$ of sequence length M based on selected amounts of phase rotation α, and inputs the results to an OFDM transmitter or a DFT-S-OFDM transmitter. The user terminal transmits output signals from the OFDM transmitter or the DFT-S-OFDM transmitter.

Here, base sequences $X_0$ to $X_{M-1}$ used in FIG. 7C may be CAZAC (Constant Amplitude Zero Auto-Correlation) sequences (for example, ZC (Zadoff-Chu) sequences), or may be sequences that conform to CAZAC sequences (for example, the computer-generated sequences set forth in TS 36.211 table 5.5.1.2-1 and table 5.5.1.2-2). Furthermore, the base sequences may be reported to the user terminal via higher layer signaling and/or physical layer signaling.

Set of Phase Rotation Amounts

Referring to FIG. 7A, a set of amounts of phase rotation, including a plurality of amounts of phase rotation that are associated with a plurality of candidate UCI values, respectively, will be described in detail.

Figure 8:
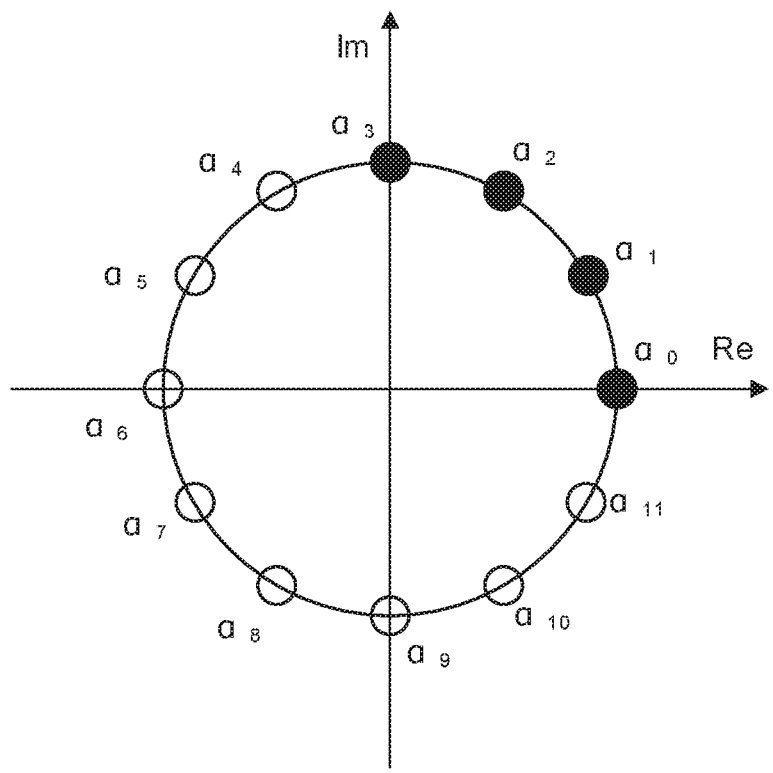
FIG. 8 is a diagram to show a first example of a set of amounts of phase rotation according to the second aspect.

FIG. 8 is a diagram to show a first example of a set of phase rotation amounts according to the second aspect. FIG. 8 assumes a case where the number of subcarriers M to use to transmit an RS is 12 (that is, when one PRB (Physical Resource Block) is used to transmit an RS). The sequence length of base sequences is determined based on the number of subcarriers, M, and the number of PRBs. In this case, one PRB is used, so that the sequence length of a base sequences is 12 (=12×1). In this case, as shown in FIG. 8, twelve amounts of phase rotation $\alpha_0$ to $\alpha_{11}$ that are provided at phase intervals of 2 π/12 are defined. The twelve sequences that are obtained by phase-rotating a base sequence by phase rotation amounts $\alpha_0$ to $\alpha_{11}$ are orthogonal to each other.

Thus, the amounts of phase rotation $\alpha_0$ to $\alpha_{11}$ may be defined based on at least one of the number of subcarriers M, the number of PRBs and the sequence length of the base sequence. The set of phase rotation amounts may be comprised of two or more amounts of phase rotation selected from the amounts of phase rotation $\alpha_0$ to $\alpha_{11}$. For example, in FIG. 8, the set of phase rotation amounts is configured to include consecutive (neighboring) amounts of phase rotation $\alpha_0$ to $\alpha_3$ among the amounts of phase rotation $\alpha_0$ to $\alpha_{11}$.

FIG. 9 are diagrams to show examples of the operation of generating RS using the set of phase rotation amounts shown in FIG. 8. When the value of UCI is 0, as shown in FIG. 9A, the user terminal applies phase rotation to base sequences $X_0$ to $X_{M-1}$ based on the amount of phase rotation $\alpha_0$ that is associated with the UCI value "0." Similarly, if the value of UCI is 1, 2 and 3, as shown in FIGS. 9B, 9C and 9D, the user terminal applies phase rotation to base sequences $X_0$ to $X_{M-1}$ based on the amounts of phase rotation $\alpha_1$, $\alpha_2$ and $\alpha_3$, associated with the UCI values "1," "2" and "3."

FIG. 10 provide diagrams to show a second example of a set of phase rotation amounts according to the second aspect. As shown in FIG. 10A, the set of phase rotation amounts may be discontinuous (unneighboring) amounts of phase rotation $\alpha_0$, $\alpha_3$, $\alpha_6$ and $\alpha_9$, selected from the amounts of phase rotation $\alpha_0$ to $\alpha_{11}$. In this case, as shown in FIG. 10B, multiple candidate values (0, 1, 2 and 3) for UCI may be associated with the amounts of phase rotation $\alpha_0$, $\alpha_3$, $\alpha_6$ and $\alpha_9$, respectively.

As shown in FIG. 10A, the amounts of phase rotation $\alpha_0$, $\alpha_3$, $\alpha_6$ and $\alpha_9$ are the most distant from each other. If a channel is strongly frequency-selective, the orthogonality between amounts of phase rotation that neighbor each other may be lost. In the set of phase rotation amounts shown in FIG. 10A, the distance between the phase rotation amounts is greater than in the set of phase rotation amounts shown in FIG. 8, so that, even in an environment in which channel frequency selectivity is significant, it is possible to reduce the increase in the UCI error rate.

Method of Multiplexing User Terminals

According to the second aspect, different sets of phase rotation amounts are assigned on a per user terminal basis, so that RSs for multiple user terminals can be multiplexed over the same carrier and the same subframe.

FIG. 11 are diagrams to show a first example of the method of multiplexing user terminals according to the second aspect. As shown in FIG. 11A, a plurality of user terminals to be multiplexed are referred to as a "UE group." By using UE-specific indices m that vary per user terminal in a UE group, a different phase rotation amounts set is represented for each user terminal.

FIG. 11B shows examples of multiple candidate values (here 0, 1, 2 and 3) for UCI and sets of phase rotation amounts that vary per user terminal. For example, in FIG. 11B, multiple candidate values (here 0, 1, 2 and 3) for UCI are associated respectively with varying amounts of phase rotation $\alpha_{m+0}$, $\alpha_{m+1}$, $\alpha_{m+2}$ and $\alpha_{m+3}$ on a per user terminal basis.

The amounts of phase rotation $\alpha_{m+0}$, $\alpha_{m+1}$, $\alpha_{m+2}$ and $\alpha_{m+3}$ constituting each user terminal's phase rotation amount set are determined based on m, which varies per user terminal. Therefore, it is possible to say that this m indicates the offset for each user terminal's set of phase rotation amounts. This m is reported from the radio base stations to the user terminal via higher layer signaling and/or physical layer signaling.

For example, in FIGS. 11A and 11B, m=0, 4, and 8 are reported to user terminals UE #0, #1 and #2, respectively. When the same number of UCI bits (here, two bits) is applied to user terminals UE #1 and #2, the interval of m between user terminals may be equal to the number of UCI candidates (here, 4). Here, a set of amounts of phase rotation, comprised of amounts of phase rotation $\alpha_0$, $\alpha_1$, $\alpha_2$ and $\alpha_3$, is configured for UE #0. For UE #1, a set of amounts of phase rotation, comprised of amounts of phase rotation $\alpha_4$, $\alpha_5$, $\alpha_6$ and $\alpha_7$, is configured. For UE #2, a set of amounts of phase rotation, comprised of amounts of phase rotation $\alpha_8$, $\alpha_9$, $\alpha_{10}$ and $\alpha_{11}$ is configured.

Note that, in FIGS. 11A and 11B, although each user terminal's set of phase rotation amounts is comprised of a plurality of neighboring phase rotation amounts, this is by no means limiting. Each user terminal's set of phase rotation amounts may be comprised of a plurality of unneighboring phase rotation amounts.

FIG. 12 is a diagram to show an example of a report of a set of amounts of phase rotation according to the second aspect. As shown in FIG. 12 if the number of UCI bits is k bits, the amounts of phase rotation $\alpha_{m+0}$, $\alpha_{m+1}$, $\alpha_{m+2}$, ... $\alpha_{m+(2^k1)}$ to constitute each user terminal's set of phase rotation amounts is determined based on m, which varies per user terminal and the number of UCI bits k. These m and k are reported from the radio base station to the user terminals via higher layer signaling and/or physical layer signaling.

Alternatively, if the number of UCI bits k is equal between user terminals, m may be represented by $n \cdot 2^k$, and n may be reported instead of m. The amount of information of n is smaller than the amount of information of m, so that overhead can be reduced. Note that k may be reported as a value that is common to all the user terminals in the UE group, or may be reported as a value that is common to all the user terminals in the cell using cell information such as broadcasting.

The above set of information that associates multiple candidate values for UCI and multiple amounts of phase rotation constituting a set of phase rotation amounts respectively may be at least one of these m, k and n.

Figure 13:
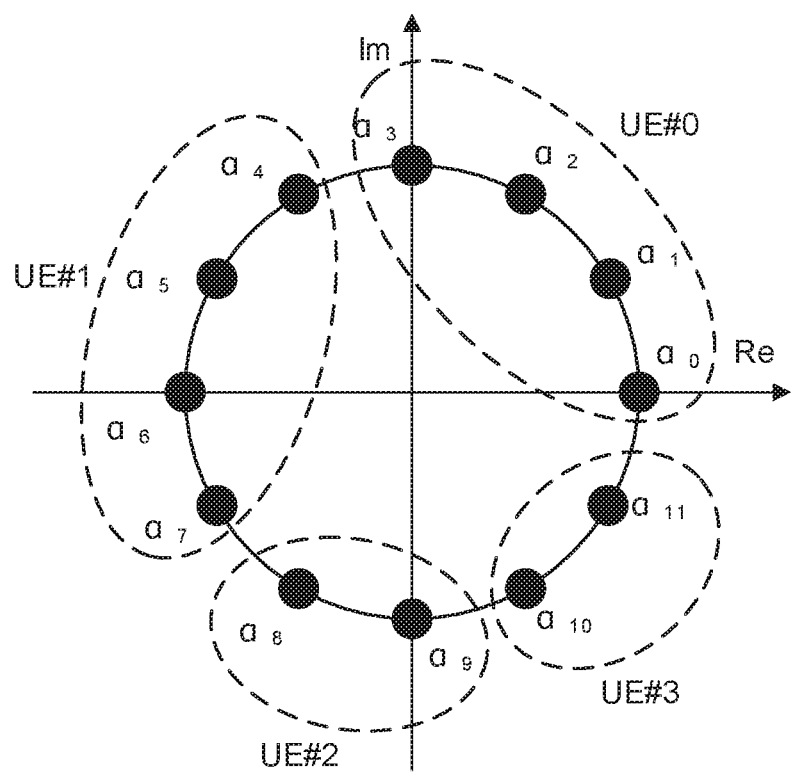
FIG. 13 is a diagram to show a second example of the method of multiplexing user terminals, according to the second aspect.

FIG. 13 is a diagram to show a second example of the method of multiplexing user terminals according to the second aspect. FIG. 13 is different from FIG. 11 not only in that the number of UCI bits k is the same between user terminals, but also in that varying numbers k of UCI bits can be assigned between user terminals. In this case, as explained in FIG. 12, the set of phase rotation amounts for user terminal using k UCI bits is comprised of amounts of phase rotation $\alpha_{m+0}, \alpha_{m+1}, \alpha_{m+2}, \ldots \alpha_{m+(2^k-1)}$, which are associated with $2^{k-1}$ candidate values for UCI. In this case, k and m may be reported to the user terminal, individually, via higher layer signaling and/or physical layer signaling.

For example, referring to FIG. 13, the number of UCI bits k for user terminals #0 and #1 is two, and the number of UCI bits k for user terminals #2 and #3 is one. Also, k=2 and m=0 are reported to user terminal (UE) #0, k=2 and m=4 are reported to user terminal #1, k=1 and m=8 are reported to user terminal #2, and k=1 and m=10 are reported to user terminal #3.

Accordingly, in FIG. 13, a set of amounts of phase rotation, comprised of amounts of phase rotation $\alpha_0, \alpha_1, \alpha_2$ and $\alpha_3$, is assigned to user terminal #0, a set of amounts of phase rotation, comprised of amounts of phase rotation $\alpha_4$, $\alpha_5$, $\alpha_6$ and $\alpha_7$, is assigned to user terminal #1, a set of amounts of phase rotation, comprised of $\alpha_8$ and $\alpha_9$, is assigned to user terminal #2, and a set of amounts of phase rotation, comprised of $\alpha_{10}$ and $\alpha_{11}$, is assigned to user terminal #3.

In this way, the number of UCI bits k is configured different among user terminals in a UE group, so that it is possible to flexibly select the user terminals to multiplex and the number thereof, and it is possible to improve the efficiency of communication.

RS Receiving Process

Next the operation in which the network (for example, a radio base station) receives an RS that is generated using an amount of phase rotation associated with UCI, and detects the UCI that is reported implicitly using this RS will be explained.

The network may detect UCI, from received signals, by using maximum likelihood detection (ML detection) (whish may also be referred to as "correlation detection"). To be more specific, the network may generate replicas of each amount of phase rotation (UCI phase rotation amount replicas) in a set of phase rotation amounts (for example, if the number of UCI bits is two bits, the network generates four patterns of replicas), and generate transmission signal waveforms, like the user terminal does, by using base sequences and UCI phase rotation amount replicas. Also, the network may calculate the correlation between the transmission signal waveforms obtained thus, and the received signal waveforms received from the transmitting apparatus, for all the UCI phase rotation amount replicas, and assume that the UCI phase rotation amount replica with the highest correlation has been transmitted.

To be more specific, the network generates transmitted signal sequences (M complex number sequences) by applying phase rotation to a base sequence based on UCI phase rotation amount replicas, for each element of received signal sequences of size M after DFT (M complex number sequences). The network calculates the likelihood by multiplying the received signal sequences and the complex conjugates of the transmitted signal sequences, per element, and finding the sum of the M sequences obtained. The likelihood may be the sum of the squares of the absolute values of the multiplication results of the transmitted signal sequences and the received signal sequences per element, or may be the sum of the absolute values of the multiplication results of the transmitted signal sequences and the received signal sequences per element. The network may estimate that the UCI value corresponding to the UCI phase rotation amount replica that shows the maximum likelihood, among all the UCI phase rotation amount replicas, has been transmitted.

Alternatively, the network may perform channel estimation (for example, four times when UCI is two bits) using UCI phase rotation amount replicas, perform demodulation and error detection (or error correction) of UCI based on the results of channel estimation, and detect UCI by specifying the UCI phase rotation amount replica in which no error is detected (or errors are detected in few bits).

Configuration of Subframes

Next, the configuration of subframes (also referred to as "frames," "slots," "subslots," "minislots," "TTIs," etc.) that transmit RSs that are generated based on amounts of phase rotation associated with UCI, as described above, will be described.

FIG. 14 are diagrams to show examples of subframe configurations according to the second aspect. For example, FIG. 14 each assume a self-contained subframe, which a DL or UL data channel, a DL control channel for transmitting DCI for assigning the DL or UL data channel, and a UL control channel for transmitting UCI are included in the same subframe, but this is by no means limiting.

As shown in FIG. 14A, an RS that is generated using an amount of phase rotation associated with UCI may be placed in a UL control channel. In this case, this RS may be multiplexed in accordance with a subcarrier arrangement shaped like the teeth of a comb (comb). In this case, RSs for different user terminals can be multiplexed over different combs. In FIG. 14A, the RS may be an SRS, for example.

Alternatively, as shown in FIG. 14B, an RS that is generated based on an amount of phase rotation associated with UCI may be placed in the UL data channel. In FIG. 14B, the RS may be, for example, a DM-RS.

FIG. 15 are diagrams to show other examples of subframe configurations according to the second example. As shown in FIG. 15A, an RS that is generated based on an amount of phase rotation associated with UCI may be placed in the last symbol in a subframe.

Figure 15A:
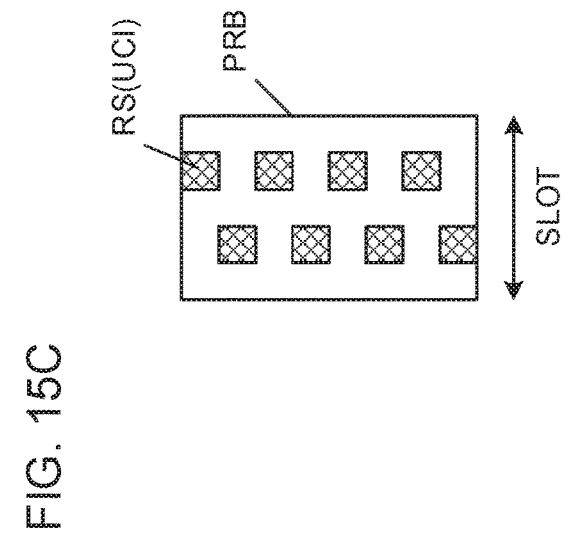
FIGS. 15A to 15D are diagrams to show other examples of subframe configurations according to the second aspect.
Figure 15C:
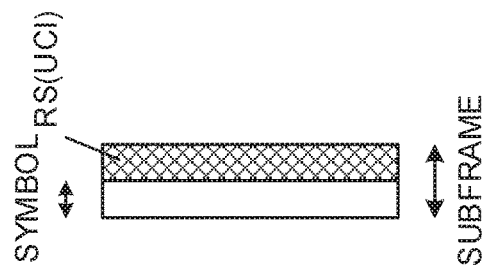
Figure 15B:
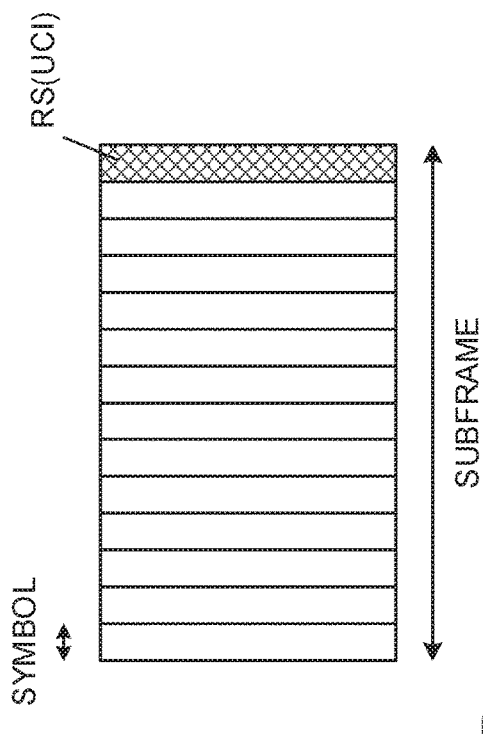
Figure 15D:
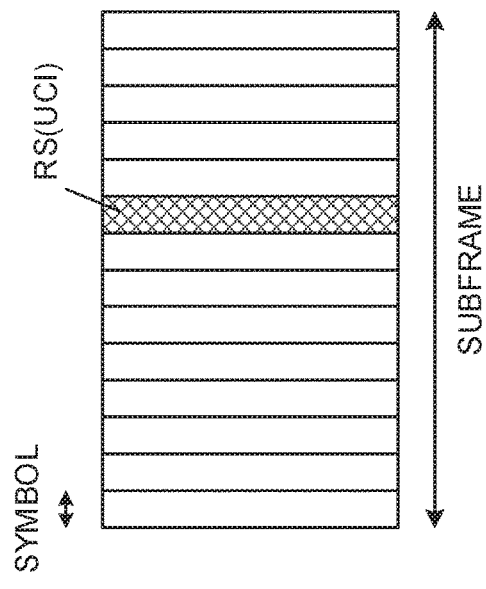

As shown in FIG. 15B, this RS may be arranged in a specific symbol in a subframe (for example, a symbol specified by the network). As shown in FIG. 15C, this RS may be arranged in a specific resource element (RE) (for example, an RE that is specified by the network and/or that is determined in advance) in one PRB. As shown in FIG. 15D, this RS may be placed in a specific symbol within a subframe with a shortened TTI. The shortened TTI of FIG. 15D is two symbols long and the last symbol is the specified symbol, and this is by no means limiting.

As described earlier, when UCI is reported implicitly using the amount of phase rotation for an RS, an RS, which reports UCI implicitly, is reported in a wide band, so that it is possible to improve the accuracy of channel estimation based on the RS, and, furthermore, ensure the power density of the RS, and reduce the bit error rate of UCI. In addition, it is possible to reduce the radio resources allocated to UCI.

Alternative Example

Figure 16:
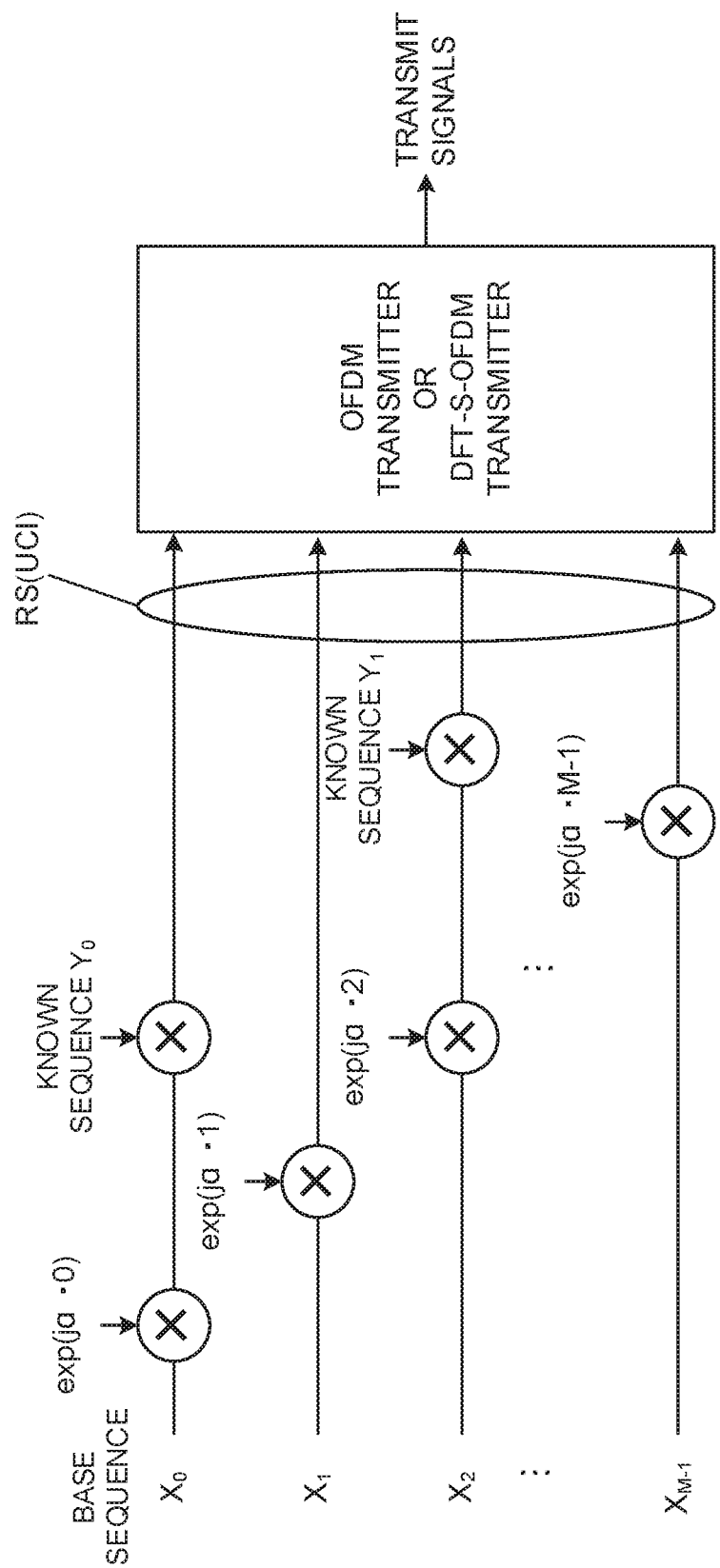
FIG. 16 is a diagram to show an example of the operation of generating RSs based on the amount of phase rotation, according to a variation of the second aspect.

Next, an alternate example of the operation of generating RSs using amounts of phase rotation $\alpha$ that are associated with UCI will be explained. FIG. 16 is a diagram to show an example of the operation of generating RSs according to an alternative example of the second aspect. In this RS generation operation, as shown in FIG. 16, the user terminal applies phase rotation to base sequences $X_0$ to $X_{M-1}$ of sequence length M based on amounts of phase rotation $\alpha$, which are selected based on UCI.

In FIG. 16, the user terminal multiplies at least part of base sequences $X_0$ to $X_{M-1}$ ($X_0$, $X_2$, ... in FIG. 16) by known sequences $Y_0$, $Y_1$, ..., and inputs the results to an OFDM transmitter or a DFT-S-OFDM transmitter. The user terminal transmits output signals from the OFDM transmitter or the DFT-S-OFDM transmitter. Note that the known sequences may be a predetermined information sequences modulated by QPSK. The known sequences may be configured by higher layer signaling and/or physical layer signaling, or may be configured by the specification.

According to this alternative example, it is possible to expect that the accuracy of channel estimation can be improved based on RSs, and the bit error rate of UCI can be lowered.

Base Sequence

Figure 19:
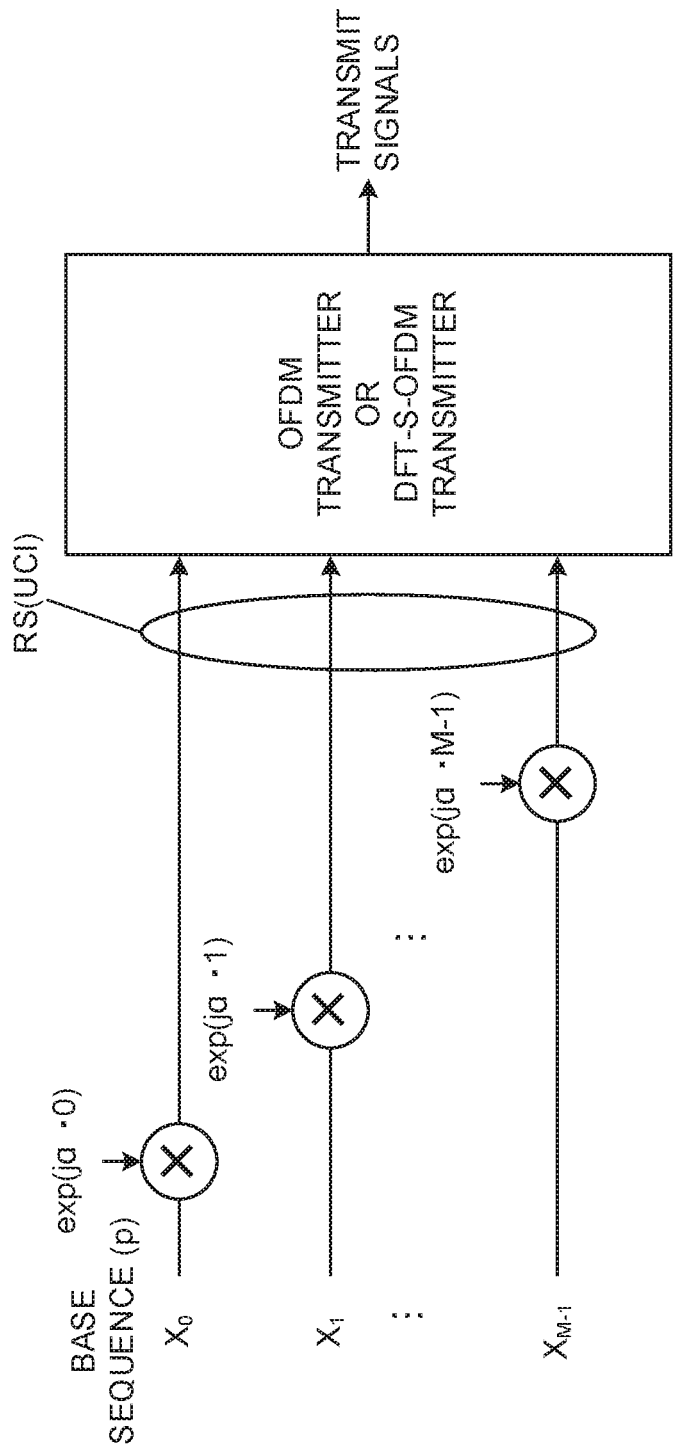
FIG. 19 is a diagram to show an example of the operation of generating RSs using base sequences, according to the second aspect.

With reference to FIG. 17 to FIG. 19 now, the operation of generating RSs using base sequences that are associated with UCI will be described. Note that, as described above, a base sequence may be a CAZAC sequence (for example, a ZC sequence) or may be a sequence conforming to a CAZAC sequence (for example, the computer-generated sequences given TS 36.211 table 5.5.1.2-1 and table 5.5.1.2-2).

The length M of base sequences (base sequence length) that are used to generate RSs is determined based on the number of subcarriers per PRB and the number of PRBs used to transmit RSs. For example, the number of subcarriers per PRB is twelve and the number of PRBs is one, the length of base sequences is 12. Also, the number of base sequences Q may be determined based on the maximum prime number not exceeding the length of base sequences. For example, if ZC sequences are to be used, the number of base sequences Q is the largest prime number that does not exceed the length of base sequences −1.

Figure 17C:
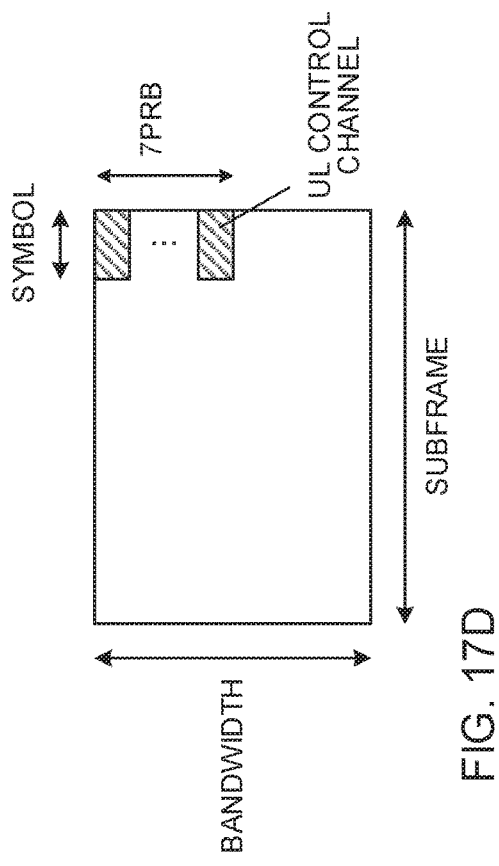
FIGS. 17A to 17D are diagrams to explain examples of the numbers of PRBs for use for a UL control channel.
Figure 17D:
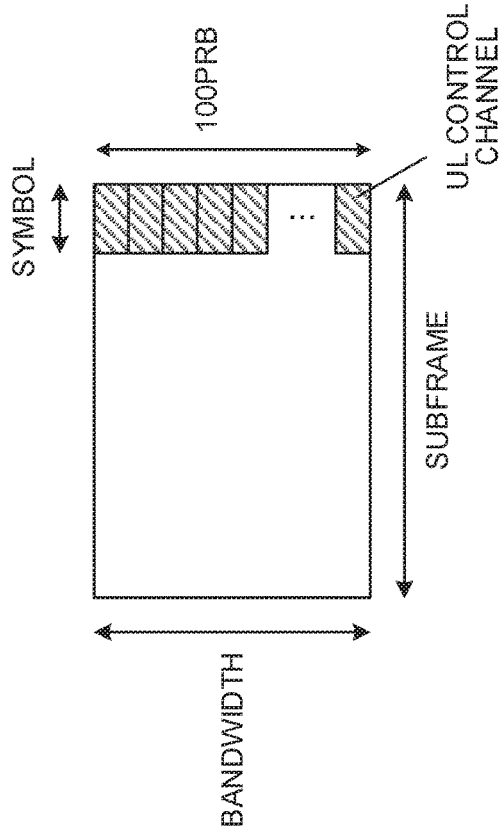
Figure 17A:
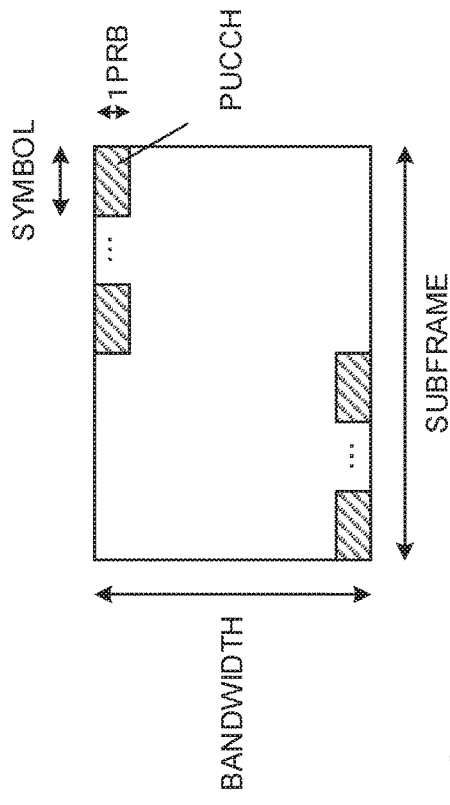

For example, as shown in FIG. 17A, since a single PRB is used in PUCCH formats 1 to 3 and 5 used in existing LTE systems (for example, LTE Rel. 13 and earlier versions), the length of base sequences is 12 (=12×1), and, if ZC sequences are used, the number of base sequences Q is 10 (the maximum prime number not exceeding 12=11, −1). Note that, in existing LTE systems (for example, LTE Rel. 13 and earlier versions), sequences that conform to CAZAC sequence are used, so that thirty base sequences are defined.

Figure 17B:
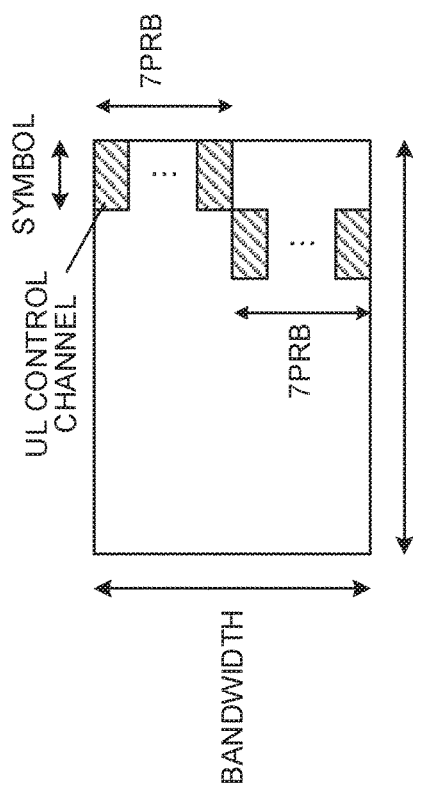

By contrast with this, in future radio communication systems, as shown in FIGS. 17B and 17C, two or more PRBs (for example, seven PRBs), per symbol, may be used for a UL control channel. For example, if seven PRBs are used, the length of base sequences is 84 (=12×7), and, when ZC sequences are used, the number of base sequences Q is 82 (the maximum prime number not exceeding 84=83, −1).

Furthermore, in future radio communication systems, as shown in FIG. 17D, multiple PRBs (for example, 100 PRBs) per symbol may be used for a UL control channel. For example, if 100 PRBs are used, the length of base sequences is 1200 (=12×100), and, when ZC sequences are used, the number of base sequences Q is 1192 (the maximum prime number not exceeding 1200=1193, −1).

In this way, assuming that the number of base sequences Q increases, candidate values for UCI may be associated in advance with these Q base sequences, respectively, so that the user terminal may select base sequences associated with UCI, and generate and transmit RSs using these base sequences. In this case, the user terminal can increase the number of UCI bits that can be reported to the radio base station. For example, referring to FIG. 17D, the number of base sequences Q is 1192, so that, given the maximum prime number $2^{10}=1024$, not exceeding the number of base sequences Q, the number of UCI bits, k, is ten bits.

Base Sequence Set

With reference to FIG. 18 and FIG. 19, a set of base sequences, including a plurality of base sequences that are respectively associated with a plurality of candidate values for UCI, will be described in detail.

FIG. 18 are diagrams to show examples of sets of base sequences according to the second aspect. FIG. 18A shows an example of configuration information that associates UCI and RS base sequences. As has been described with the first aspect, this configuration information may be reported to the user terminal by higher layer signaling and/or physical layer signaling.

As shown in FIG. 18A, this configuration information may be information that represents a set of information that associates, respectively, a plurality of candidate values for UCI (here, 0, 1, 2, ... , Q−1) and a plurality of base sequences (Q base sequences in this case) that are used to generate RSs. These multiple base sequences are also referred to as "a base sequence set." Note that, in place of base sequences, information to represent each base sequence (which may be, for example, an index, a base sequence number, etc.) included in the base sequence set may be associated with each candidate value for UCI.

As shown in FIG. 18B, the base sequence set may be a plurality of base sequences that are orthogonal to each other. As mentioned earlier, the length of each base sequence (base sequence length) M may be calculated based on the number of subcarriers (for example, twelve) per PRB and the number of PRBs that are used to transmit an RS. Also, the number of base sequences Q may be the maximum prime number not exceeding the base sequence length−1.

The user terminal selects the base sequence that corresponds to the UCI to be reported, from the set of base sequences shown in FIG. 18A. For example, when the user terminal reports the UCI "2" to the radio base station, the user terminal selects the base sequence (2) that is associated with the UCI "2" in FIG. 18A.

FIG. 19 is a diagram to show an example of the operation of generating RSs using base sequences that are associated with UCI, according to the second aspect. In this RS generation operation, as shown in FIG. 19, the user terminal applies phase rotation to base sequences $X_0$ to $X_{M-1}$, which are selected based on UCI, based on predetermined amounts of phase rotation α, and inputs the results to an OFDM transmitter or a DFT-S-OFDM transmitter. The user terminal transmits output signals from the OFDM transmitter or the DFT-S-OFDM transmitter.

In FIG. 19, the predetermined amounts of phase rotation α may be reported by higher layer signaling and/or physical layer signaling, or may be amounts of phase rotation that are associated with UCI. If the predetermined amounts of phase rotation α are amounts of phase rotation that are associated with UCI. As shown in FIG. 20, each candidate value for UCI may be associated with a combination of a base sequence and an amount of phase rotation. In this case, compared to the case where each candidate value for UCI is associated with an amount of phase rotation (for example, as in FIGS. 7, 10, 11 and 12) or each candidate value for UCI is associated only with a base sequence (for example, as in FIG. 18), the number of UCI bits that can be reported can be increased.

Note that, in FIG. 18B, different base sequence sets are assigned on a per user terminal basis, using a plurality of base sequences that are orthogonal to each other, so that RSs for a plurality of user terminals can be multiplexed over the same carrier and the same subframe. In this case, the method of multiplexing user terminals (for example, FIG. 11 and FIG. 13) for use when UCI is reported implicitly by using the amount of phase rotation can be appropriately applied.

Also, in the RS receiving process, UCI may be detected based on maximum likelihood detection or channel estimation, as when UCI is reported implicitly by using the amount of phase rotation. In addition, the subframe configurations that have been described with reference to FIG. 14 and FIG. 15 can also be applied to the case where UCI is reported implicitly using base sequences.

As described above, according to the second aspect, candidate values for UCI are associated with amounts of phase rotation and/or base sequences that are used to generate RSs, and a set of information that represents these associations is reported to the user terminal. Therefore, the user terminal can properly report UCI by transmitting RSs that are generated based on the amount of phase rotation and/or the base sequence that are associated with the UCI.

Other Aspects

Although examples have been illustrated with the above description where UCI is reported implicitly by using parameters that are used to generate RSs (for example, amounts of phase rotation and/or base sequences), but this is by no means limiting, and parameters that relate to data (for example, spreading code and/or CRC) may be used. Now, an example of reporting UCI implicitly by using spreading code and/or CRC in code division multiple access (CDMA) will be described below.

Spreading Code

FIG. 21 are diagrams to show examples of operations of generating data using spreading codes that are selected based on UCI, according to other aspects of the present invention. FIG. 21 presume that a set of information that associates a plurality of candidate values for UCI and a plurality of spreading codes (for example spreading codes A, B, C and D), respectively, is configured by higher layer signaling and/or physical layer signaling. These multiple spreading codes may be referred to as a "set of spreading codes" and so on.

Figure 21A:
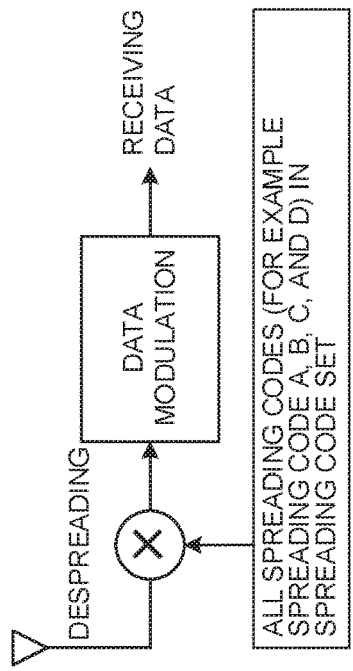
FIGS. 21A to 21G are diagrams to show examples of reports using spreading codes, according to other aspects of the present invention.

As shown in FIG. 21A, the user terminal selects the spreading code that corresponds to the value of UCI, from a plurality of spreading codes constituting a set of spreading codes. The user terminal multiplies the transmission signal by the selected spreading code (spreading). By means of this spreading, the spectrum of the transmission signal, which is shown in FIG. 21C, becomes the spectrum shown in FIG. 21D.

Figure 21B:
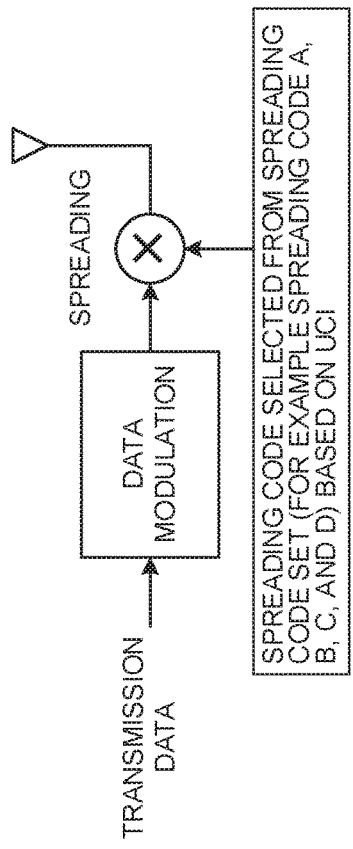
Figure 21C:
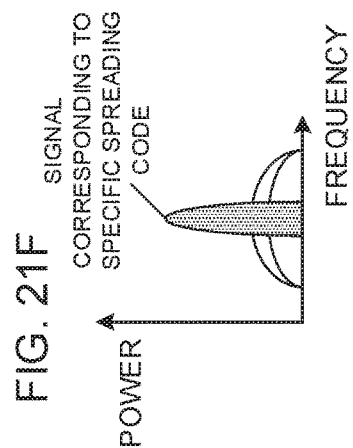
Figure 21D:
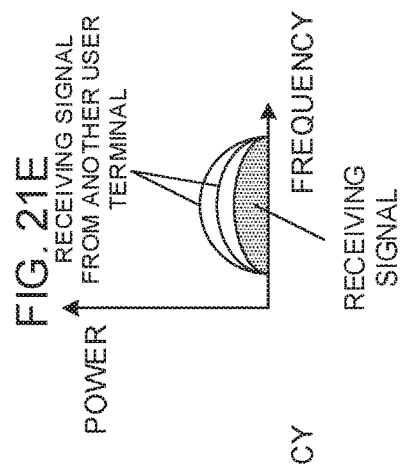

As shown in FIG. 21B, the network (for example, a radio base station) multiplies (despreads) the received signal by each spreading code in the spreading code set. After that, the network compares the power spectral densities of the multiplication results of each spreading code, and selects the spreading code corresponding to the maximum power spectral density and the UCI value corresponding to that. This allows the network to perform blind estimation of UCI.

Figure 21E:
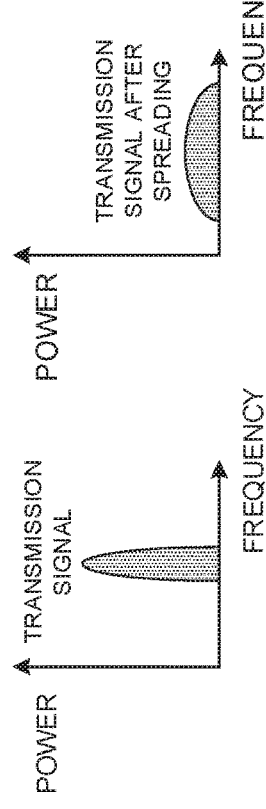
Figure 21F:
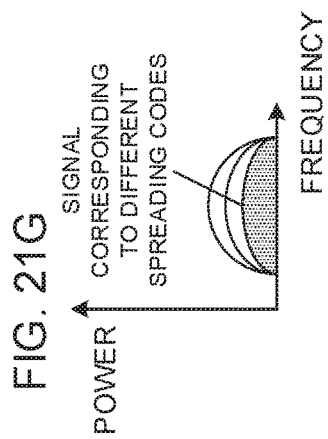
Figure 21G:
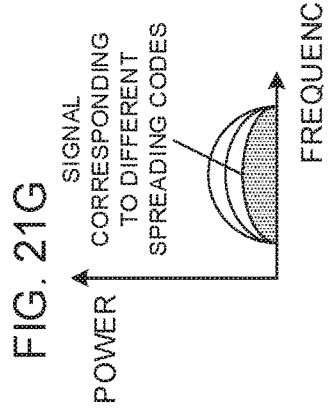

Note that, instead of power spectral density, power or amplitude may be used for blind estimation of UCI. As shown in FIG. 21E, a received signal that is spread by a specific user terminal's specific spreading code is multiplexed with received signals spread by other user terminals' different spreading codes, and received. By despreading with a specific spreading code, the power spectral density of the signal corresponding to that specific spreading code increases, as shown in FIG. 21F. By despreading with a specific spreading code, as shown in FIG. 21G, the power spectral density of a signal corresponding to a different spreading code changes little.

Note that, in FIG. 21, different sets of spreading codes are assigned on a per user terminal basis, so as to multiplex multiple user terminal over the same carrier and the same subframe.

CRC

Alternatively, as shown in FIG. 22, a set of information that associates a plurality of candidate values for UCI and a plurality of CRC sequences, respectively, may be configured by higher layer signaling and/or physical layer signaling. These multiple CRC sequences may be referred to as a "CRC set" and so on.

FIG. 22 is a diagram to show an example of a CRC set according to another aspect of the present invention. The user terminal selects the CRC sequence corresponding to the value of UCI from the CRC set. The user terminal selects the CRC sequence corresponding to the UCI to be reported, from the CRC sequence set, and transmits the selected CRC sequence.

The network (for example, a radio base station) can perform a CRC check of the received signal using each CRC sequence included in the CRC set, and identify the UCI reported from the user terminal based on the CRC sequences that have passed the CRC check.

When information bits (for example, UCI) are transmitted with a CRC sequence (for example, eight bits) appended thereto, it is necessary to transmit "the number of information bits+eight bits." On the other hand, when only the CRC sequence that is associated with the UCI is transmitted, as shown in FIG. 22, the number of transmission bits can be kept to eight bits, so that the efficiency of communication can be improved.

Note that, referring to FIG. 22, a plurality of user terminals may be multiplexed over the same carrier and the same subframe by assigning different CRC sets on a per user terminal basis.

Radio Communication System

Now, the structure of a radio communication system according to the present embodiment will be described below. In this radio communication system, each radio communication method according to the above-described embodiments is employed. Note that the radio communication method according to each embodiment may be used alone or may be used in combination.

Figure 23:
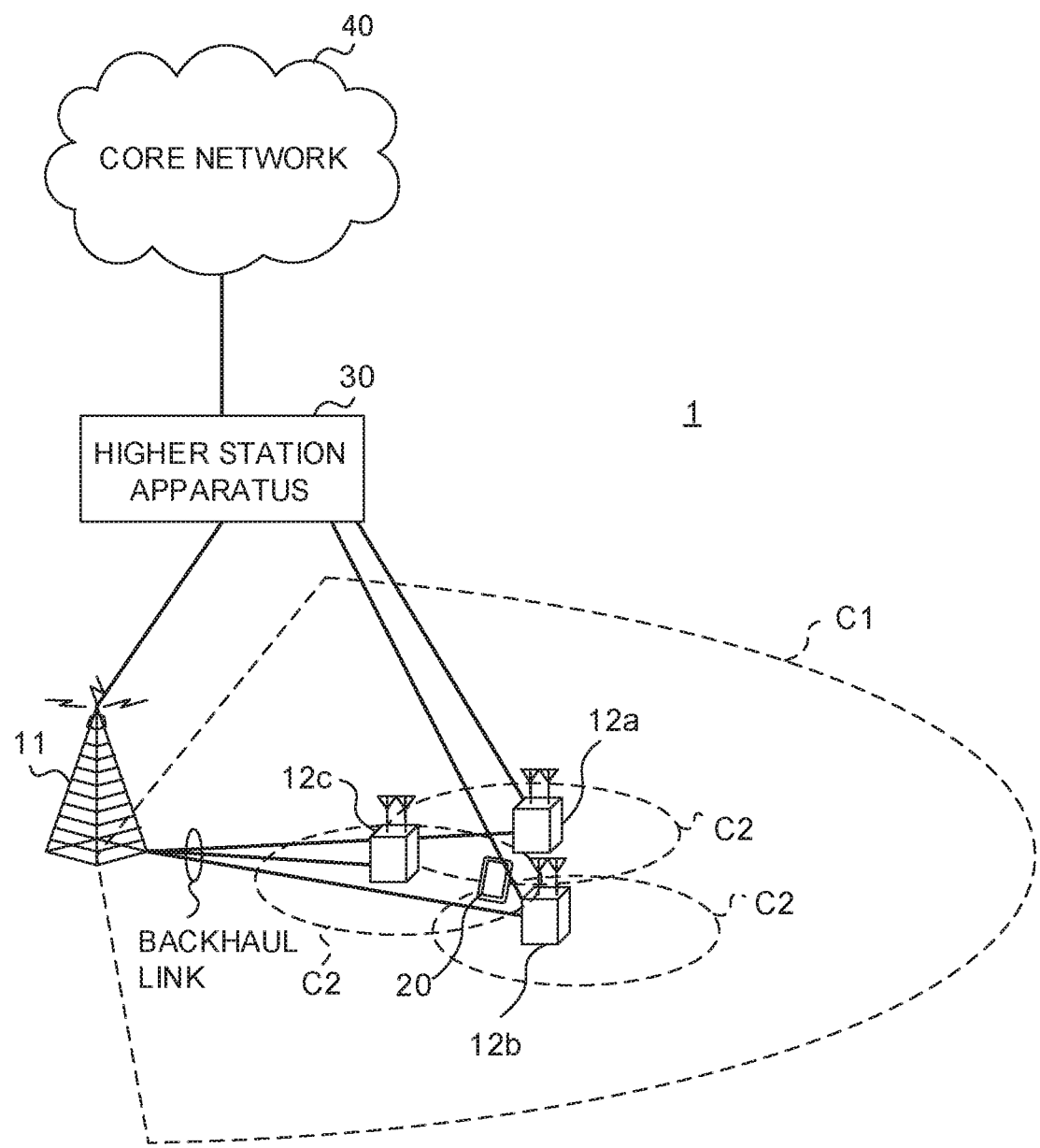
FIG. 23 is a diagram to show an example of a schematic structure of a radio communication system according to the present embodiment of the present invention.

FIG. 23 is a diagram to show an example of a schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. The radio communication system 1 may be also referred to as "SUPER 3G," "LTE-A (LTE-Advanced)," "IMT-Advanced," "4G," "5G," "FRA (Future Radio Access)," "NR (New RAT: New Radio Access Technology)," and so on.

The radio communication system 1 shown in FIG. 23 includes a radio base station 11 that forms a macro cell C1, and radio base stations 12a to 12c that form small cells C2, are placed within the macro cell C1 and which are narrower than the macro cell C1. Also, user terminals 20 are placed in the macro cell C1 and in each small cell C2. A structure in which different numerologies are applied between cells and/or within cells may be adopted.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use license band CCs and unlicensed band CCs as a plurality of cells.

Furthermore, the user terminal 20 can perform communication using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Furthermore, in each cell (carrier), a single numerology may be employed, or a plurality of different numerologies may be employed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1 as radio access schemes, OFDMA (orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combinations of these, and OFDMA may be used in UL.

In the radio communication system 1, a DL shared channel (PDSCH (Physical Downlink Shared CHannel), which is also referred to as, for example, a "DL data channel"), which is used by each user terminal 20 on a shared basis, a broadcast channel (PBCH (Physical Broadcast CHannel)), L1/L2 control channels and so on, are used as DL channels. User data, higher layer control information and SIBS (System Information Blocks) are communicated in the PDSCH. Also, the MIB (Master Information Blocks) is communicated in the PBCH.

The L1/L2 control channels include DL control channels (a PDCCH (Physical Downlink Control CHannel), an EPDCCH (Enhanced Physical Downlink Control CHannel) and so on), a PCFICH (Physical Control Format Indicator CHannel), a PHICH (Physical Hybrid-ARQ Indicator Channel) and so on. Downlink control information (DCI), including PDSCH and PUSCH scheduling information, is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, a shared channel (PUSCH (Physical Uplink Shared CHannel), which is also referred to as "UL data channel" and so on), which is used by each user terminal 20 on a shared basis, a UL control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

Radio Base Station

Figure 24:
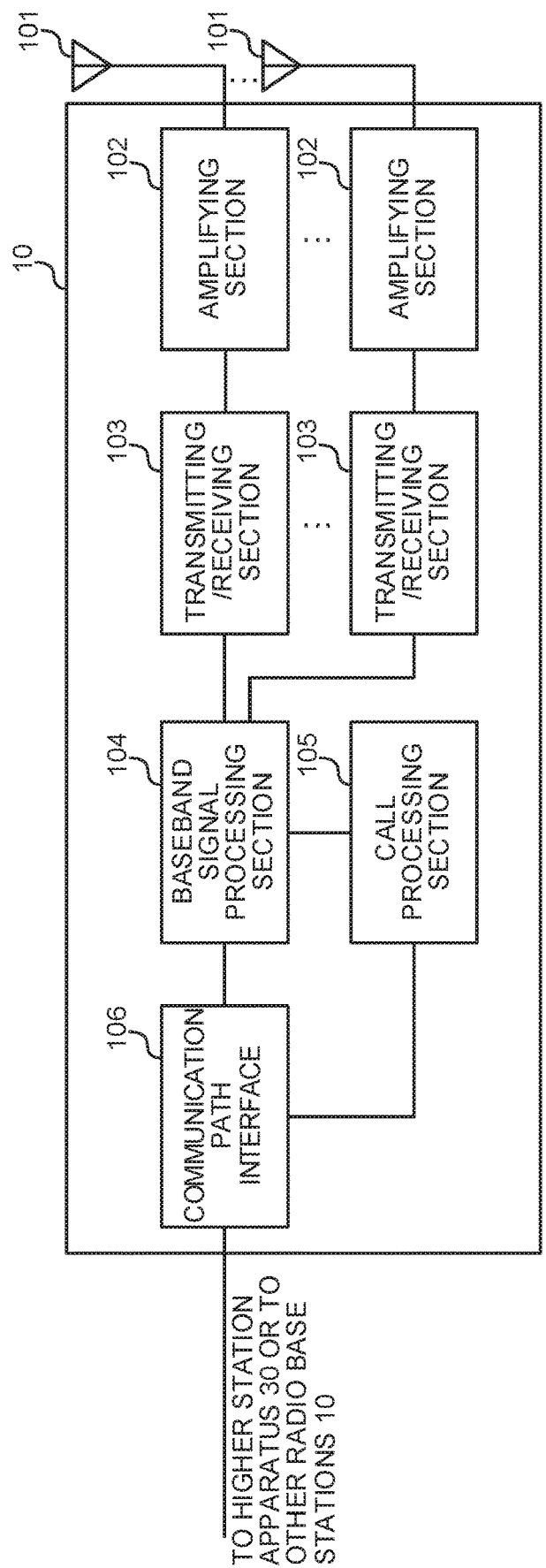
FIG. 24 is a diagram to show an example of an overall structure of a radio base station according to the present embodiment.

FIG. 24 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 can constitute the receiving apparatus of the present invention in the UL and the transmitting apparatus of the present invention in the DL.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a preceding process, and the result is forwarded to each transmitting/receiving sections 103. Furthermore, downlink control signals are also subjected to transmission processes such as channel coding and an inverse fast Fourier transform, and forwarded to the transmitting/receiving sections 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the UL signals amplified in the amplifying sections 102. The received signals are converted into the baseband signal through frequency conversion in the transmitting/receiving sections 103 and output to the baseband signal processing section 104.

In the baseband signal processing section 104, UL data contained in the input UL signal is subjected to a fast Fourier transform (FFT) process (or a discrete Fourier transform (DFT) process), an inverse discrete Fourier transform (IDFT) process (or an inverse fast Fourier transform (IFFT)) process, error correction decoding, a receiving process based on MAC retransmission control, and RLC layer and PDCP layer receiving processes, and the result is forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and/or receive signals (backhaul signaling) with neighboring radio base stations 10 via an inter-base station interface (for example, an interface in compliance with the CPRI (Common Public Radio Interface), such as optical fiber, the X2 interface, etc.).

In addition, the transmitting/receiving sections 103 transmit DL signals including at least one of a DL data signal, a DL control signal and a DL reference signal) to the user terminal 20, and receive UL signals (including at least one of a UL data signal, a UL control signal and a UL reference signal) from the user terminal 20.

In addition, the transmit receiving sections 103 may receive reference signals (RSs) that are generated based on amounts of phase rotation and/or base sequences that are associated with UCI. In addition, the transmitting/receiving sections 103 may transmit RSs that are generated using amounts of phase rotation and/or base sequences that are associated with control information for the user terminal 20.

In addition, the transmitting/receiving sections 103 may receive data that is generated using spreading codes that are associated with UCI or CRC sequences associated with UCI. In addition, the transmitting/receiving sections 103 may transmit data that is generated using spreading codes that are associated with control information for the user terminal 20, or transmit CRC with which this control information is associated.

Furthermore, the transmitting/receiving sections 103 may transmit the configuration information and the set information, which have been described above.

Figure 25:
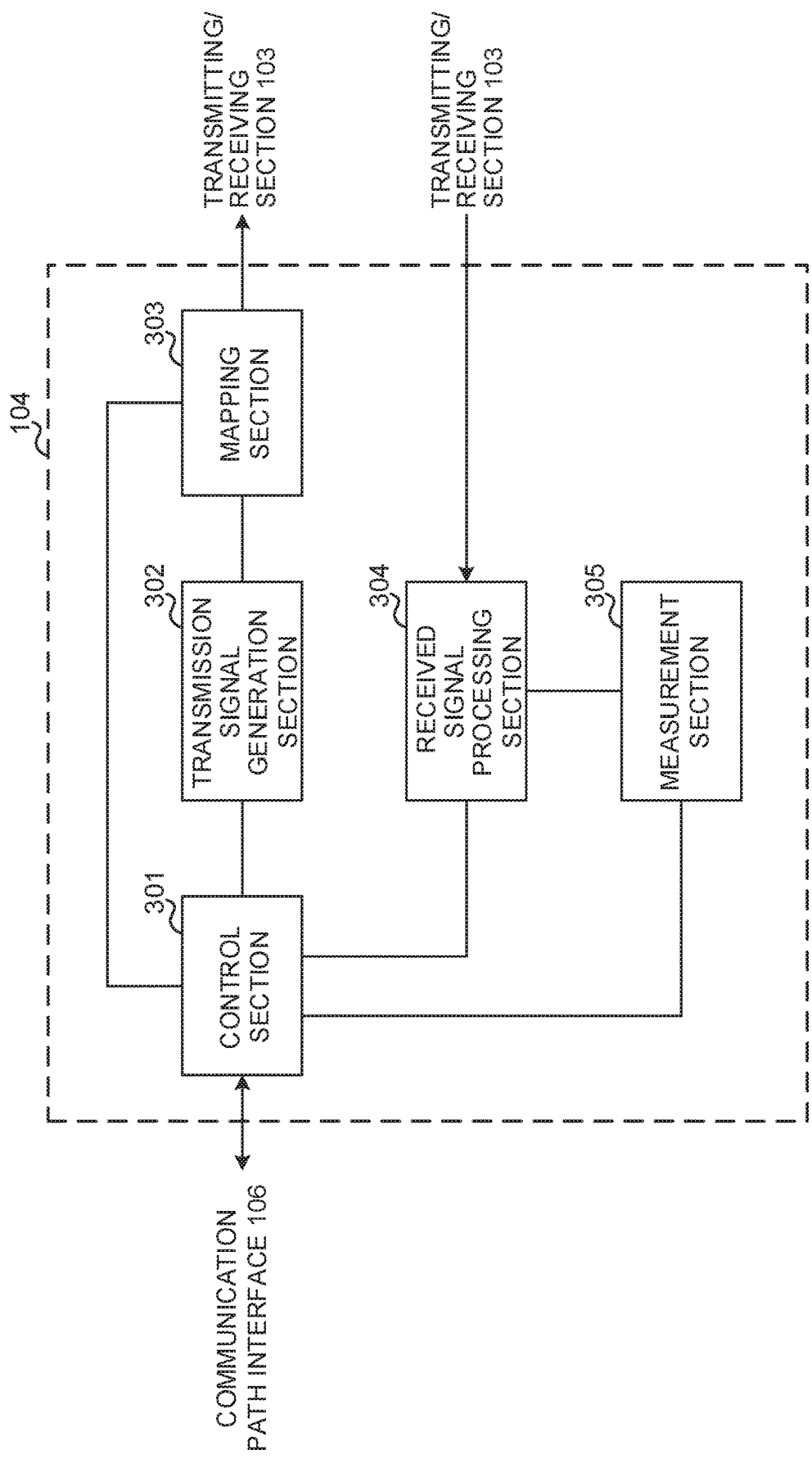
FIG. 25 is a diagram to show an example of a functional structure of a radio base station according to the present embodiment.

FIG. 25 is a diagram to show an example of a functional structure of a radio base station according to the present embodiment. Note that, although FIG. 25 primarily shows functional blocks that pertain to characteristic parts of the present embodiment, the radio base station 10 has other functional blocks that are necessary for radio communication as well. As shown in FIG. 25, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, the generation of DL signals by the transmission signal generation section 302, the mapping of DL signals by the mapping section 303, the receiving process (for example, demodulation) for UL signals by the received signal processing section 304 and the measurements by the measurement section 305.

To be more specific, the control section 301 schedules user terminals 20. To be more specific, the control section 301 may perform the scheduling and/or retransmission control of a DL data channel and/or a UL data channel based on UCI from the user terminals 20.

In addition, the control section 301 may control the receipt (or detection) of UCI reported from the user terminals 20. To be more specific, the control section 301 may control the receipt of RSs that are generated using amounts of phase rotation and/or base sequences that are associated with UCI, and control the detection of the UCI (second aspect). For example, the control section 301 may control the received signal processing section 304 and the measurement section 305 to detect an RS from received signals, and detect the UCI corresponding to the amount of phase rotation and/or the base sequence of the RS.

Also, the control section 301 may control the received signal processing section 304 to detect a spreading code from received signals, and detect the UCI corresponding to that spreading code (other aspects). In addition, the control section 301 may control the received signal processing section 304 to detect a CRC sequence from received signals, and detect the UCI corresponding to that CRC sequence (other aspects).

Furthermore, the control section 301 may control transmission of control information to a user terminal 20. To be more specific, the control section 301 may select (switch) the RS to transmit based on the timing for transmitting the RS and/or the timing for transmitting control information for the user terminal 20 (first aspect and FIG. 4). Furthermore, the control section 301 may determine the transmission resource for the RS based on the transmission timing of the RS (FIG. 6).

Furthermore, the control section 301 may control generation of RSs. For example, the control section 301 may control the transmission signal generation section 302 to select an amount of phase rotation and/or a base sequence corresponding to control information for the user terminal 20 and generate an RS using this selected amount of phase rotation and/or base sequence (second aspect). Also, the control section 301 may control the transmission signal generation section 302 to generate an RS using the amount of phase rotation and/or the base sequence corresponding to a specific candidate value for the control information (for example, a NACK) (first aspect).

Furthermore, the control section 301 may control the transmission signal processing section 302 to select the spreading code corresponding to that control information and spread a transmission signal using this spreading code (other aspects). In addition, the control section 301 may control the transmission signal generation section 302 to select the CRC sequence corresponding to that control information and include this CRC sequence in the transmission signal (other aspects).

The control section 301 can be constituted by a controller, a control circuit or control apparatus that can be described based on general understanding of the technical field to which the present invention pertains.

The transmission signal generation section 302 generates DL signals (including DL data signals, DL control signals, DL reference signals and so on) based on commands from the control section 301, and outputs these signals to the mapping section 303.

The transmission signal generation section 302 may be a DFT-S-OFDM transmitter (FIG. 7, FIG. 9, FIG. 16 and FIG. 19), another SC transmitter or an OFDM transmitter (FIG. 7, FIG. 9, FIG. 16 and FIG. 19), or may be any signal generator, signal generating circuit or signal generation apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. For the mapping section 303, a mapper, a mapping circuit or mapping apparatus that can be described based on general understanding of the technical field to which the present invention pertains can be used.

The received signal processing section 304 performs receiving processes (for example, demapping, demodulation, decoding, etc.) of UL signals transmitted from the user terminals 20 (including, for example, a UL data signal, a UL control signal, a UL reference signal, etc.). To be more specific, the received signal processing section 304 demodulates and decodes a UL signal (for example, a UL control channel) based on the result of channel estimation in the measurement section 305. Alternatively, the received signal processing section 304 may identify (demodulate, decode, etc.) a UL signal using maximum likelihood detection (which may also be referred to as "correlation detection").

The received signal processing section 304 may be a DFT-S-OFDM receiver, another SC receiver or an OFDM receiver, or may be any receiving processor or receiving processing (demodulating, encoding, etc.) apparatus that can be described based on general understanding of the technical field to which the present invention pertains.

The measurement section 305 performs channel estimation based on reference signals (for example, DM-RS). The measurement section 305 may also measure channel states (sounding) based on reference signals (for example, SRS). The measurement section 305 can be constituted by a measurer, a measurement circuit or measurement apparatus that can be described based on general understanding of the technical field to which the present invention pertains.

User Terminal

Figure 26:
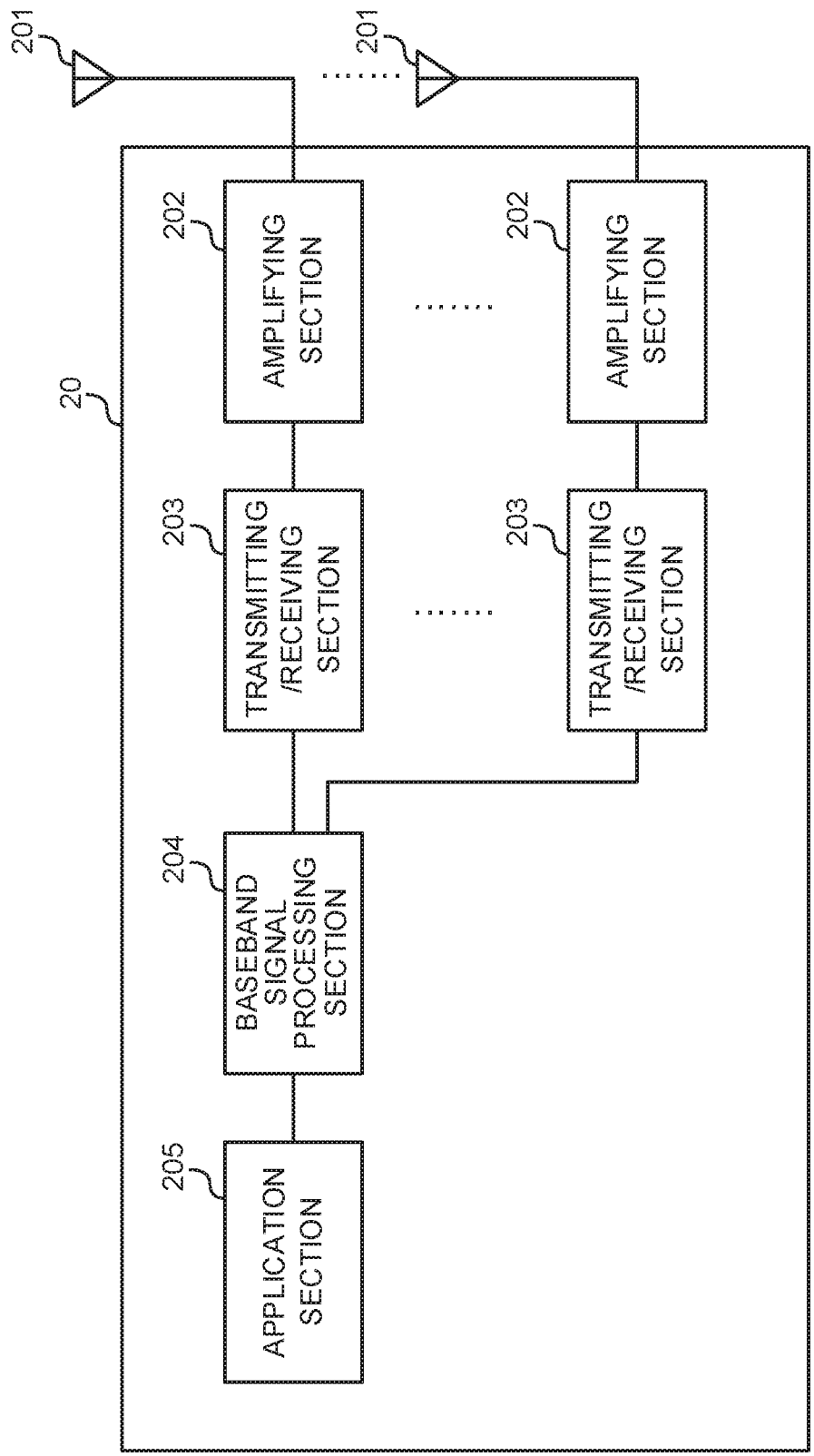
FIG. 26 is a diagram to show an example of an overall structure of a user terminal according to the present embodiment.

FIG. 26 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. The user terminal 20 can constitute the transmitting apparatus of the present invention in the UL and the receiving apparatus of the present invention in the DL.

Radio frequency signals that are received in a plurality of transmitting/receiving antennas 201 are each amplified in the amplifying sections 202. Each transmitting/receiving section 203 receives the DL signals amplified in the amplifying sections 202. The received signals are subjected to frequency conversion and converted into the baseband signal in the transmitting/receiving sections 203, and output to the baseband signal processing section 204.

In the baseband signal processing section 204, the baseband signal that is input is subjected to FFT (DFT) process, error correction decoding, a retransmission control receiving process, and so on. The DL data is forwarded to the application section 205. The application section 205 performs processes related to higher layers above the physical layer and the MAC layer, and so on. Also, the broadcast information is also forwarded to application section 205.

Meanwhile, the UL data is input from the application section 205 to the baseband signal processing section 204. In the baseband signal processing section 204, transmission processes related to retransmission control (for example, HARQ transmission process), channel coding, rate matching, puncturing, a DFT (or FFT) process, an IFFT (or IDFT) process, and so on are performed, and the result is forwarded to each transmitting/receiving section 203. The UCI is also subjected to at least one of channel coding, rate matching, puncturing, a DFT (or FFT) process and an IFFT (or IDFT) process, and the result is forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive DL signals (including a DL data signal, a DL control signal, a DL reference signal, etc.) of numerologies configured in the user terminal 20, and transmit UL signals (including a UL data signal, a UL control signal, a UL reference signal, etc.) of these numerologies.

In addition, the transmitting/receiving sections 203 may transmit reference signals (RSs) that are generated using amounts of phase rotation and/or base sequences associated with UCI. In addition, the transmitting/receiving sections 203 may receive RSs that are generated using amounts of phase rotation and/or base sequences associated with control information for the user terminal 20.

In addition, the transmitting/receiving sections 203 may transmit data that is generated using spreading codes associated with UCI, or CRC sequences that are associated with UCI. In addition, the transmitting/receiving sections 103 may receive data that is generated using spreading codes associated with control information for the user terminal 20, or CRC sequences associated with UCI.

In addition, the transmitting/receiving section 203 may receive the above-described configuration information and set information.

For the transmitting/receiving sections 203, transmitters/receivers, transmitting/receiving circuits or transmitting/receiving apparatus that can be described based on general understanding of the technical field to which the present invention pertains can be used. Furthermore, a transmitting/receiving section 203 may be structured as one transmitting/receiving section, may be formed with a transmitting section and a receiving section.

Figure 27:
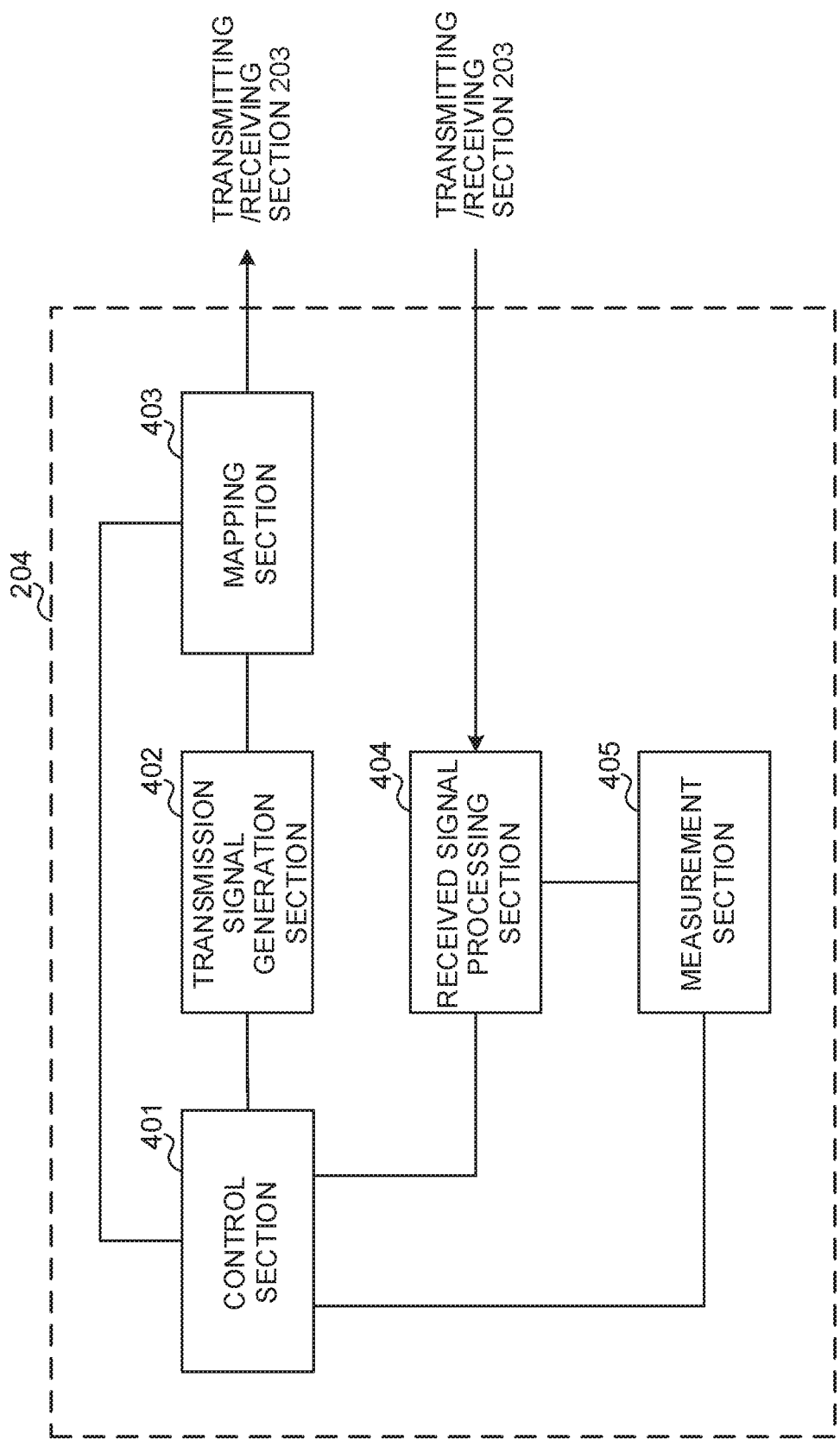
FIG. 27 is a diagram to show an example of a functional structure of a user terminal according to the present embodiment.

FIG. 27 is a diagram to show an example of a functional structure of a user terminal according to the present embodiment. Note that, although FIG. 27 primarily shows functional blocks that pertain to characteristic parts of the present embodiment, the user terminal 20 has other functional blocks that are necessary for radio communication as well. As shown in FIG. 27, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

In addition, the control section 401 may control the reporting of UCI. To be more specific, the control section 401 may select (switch) the RS to transmit based on the timing for transmitting the RS and/or the timing for transmitting UCI (first aspect and FIG. 4). Furthermore, the control section 401 may determine the transmission resource for the RS based on the transmission timing of the RS (FIG. 6).

Furthermore, the control section 401 may control generation of RSs. For example, the control section 401 may control the transmission signal generation section 402 to select an amount of phase rotation and/or a base sequence that corresponds to UCI, and generate an RS using this selected amount of phase rotation and/or base sequence (second aspect). In addition, the control section 401 may control the transmission signal generation section 402 to generate an RS using the amount of phase rotation and/or the base sequence corresponding to a specific candidate value for the UCI (for example, a NACK) (first aspect).

Furthermore, the control section 401 may control the transmission signal processing section 402 to select the spreading code corresponding to that UCI and spread a transmission signal using this spreading code (other aspects). In addition, the control section 401 may control the transmission signal generation section 402 to select the CRC sequence corresponding to that UCI and include this CRC sequence in the transmission signal (other aspects).

In addition, the control section 401 may control the receipt (or detection) of control information reported from the radio base station 10. To be more specific, the control section 401 may control the receipt of RSs that are generated using amounts of phase rotation and/or base sequences that are associated with the control information, and control the detection of the control information (second aspect). For example, the control section 401 may control the received signal processing section 404 and the measurement section 405 to detect an RS from received signals, and detect the control information corresponding to the amount of phase rotation and/or the base sequence of the RS.

Also, the control section 401 may control the received signal processing section 404 to detect a spreading code from received signals, and detect the control information corresponding to that spreading code (other aspects). Also, the control section 401 may control the received signal processing section 404 to detect a CRC sequence from received signals, and detect e UCI corresponding to that CRC sequence (other aspects).

For the control section 401, a controller, a control circuit or control apparatus that can be described based on general understanding of the technical field to which the present invention pertains can be used.

In the transmission signal generation section 402, UL signals (including a UL data signal, a UL control signal, a UL reference signal, UCI, etc.) are generated (including, for example, encoding, rate matching, puncturing, modulation, etc.) based on commands from the control section 401, and output to the mapping section 403.

The transmission signal generation section 402 may be a DFT-S-OFDM transmitter (FIG. FIG. 9, FIG. 16 and FIG. 19), another SC transmitter or an OFDM transmitter (FIG. 7, FIG. 9, FIG. 16 and FIG. 19), or may be any signal generator, signal generating circuit or signal generation apparatus that can be described based on general understanding of the technical field to which the present invention pertains.

The mapping section 403 maps the UL signals generated in the transmission signal generation section 402 to radio resources based on commands from the control section 401, and output the result to the transmitting/receiving sections 203. For the mapping section 403, a mapper, a mapping circuit or mapping apparatus that can be described based on general understanding of the technical field to which the present invention pertains can be used.

The received signal processing section 404 performs receiving processes (for example, demapping, demodulation, decoding, etc.) of DL signals (including DL data signals, scheduling information, DL control signals, DL reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

Also, the received signal processing section 404 may demodulate and decode a DL signal (for example, a DL control channel) based on the result of channel estimation in the measurement section 405. Alternatively, the received signal processing section 404 may identify (demodulate, decode, etc.) a DL signal using maximum likelihood detection (which may also be referred to as "correlation detection"), regardless of the result of channel estimation.

The received signal processing section 404 may be a DFT-S-OFDM receiver, another SC receiver or an OFDM receiver, or may be any receiving processor and receiving processing (demodulating, encoding, etc.) apparatus that can be described based on general understanding of the technical field to which the present invention pertains.

The measurement section 405 measures channel states based on reference signals (for example, CSI-RS) from the radio base station 10, and outputs the measurement results to the control section 401. Note that the channel state measurements may be conducted per CC.

The measurement section 405 performs channel estimation based on reference signals (for example, DM-RS). The measurement section 405 may also measure channel states (sounding) based on reference signals (for example, SRS). The measurement section 405 can be constituted by a measurer, a measurement circuit or measurement apparatus that can be described based on general understanding of the technical field to which the present invention pertains.

Hardware Structure

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 28:
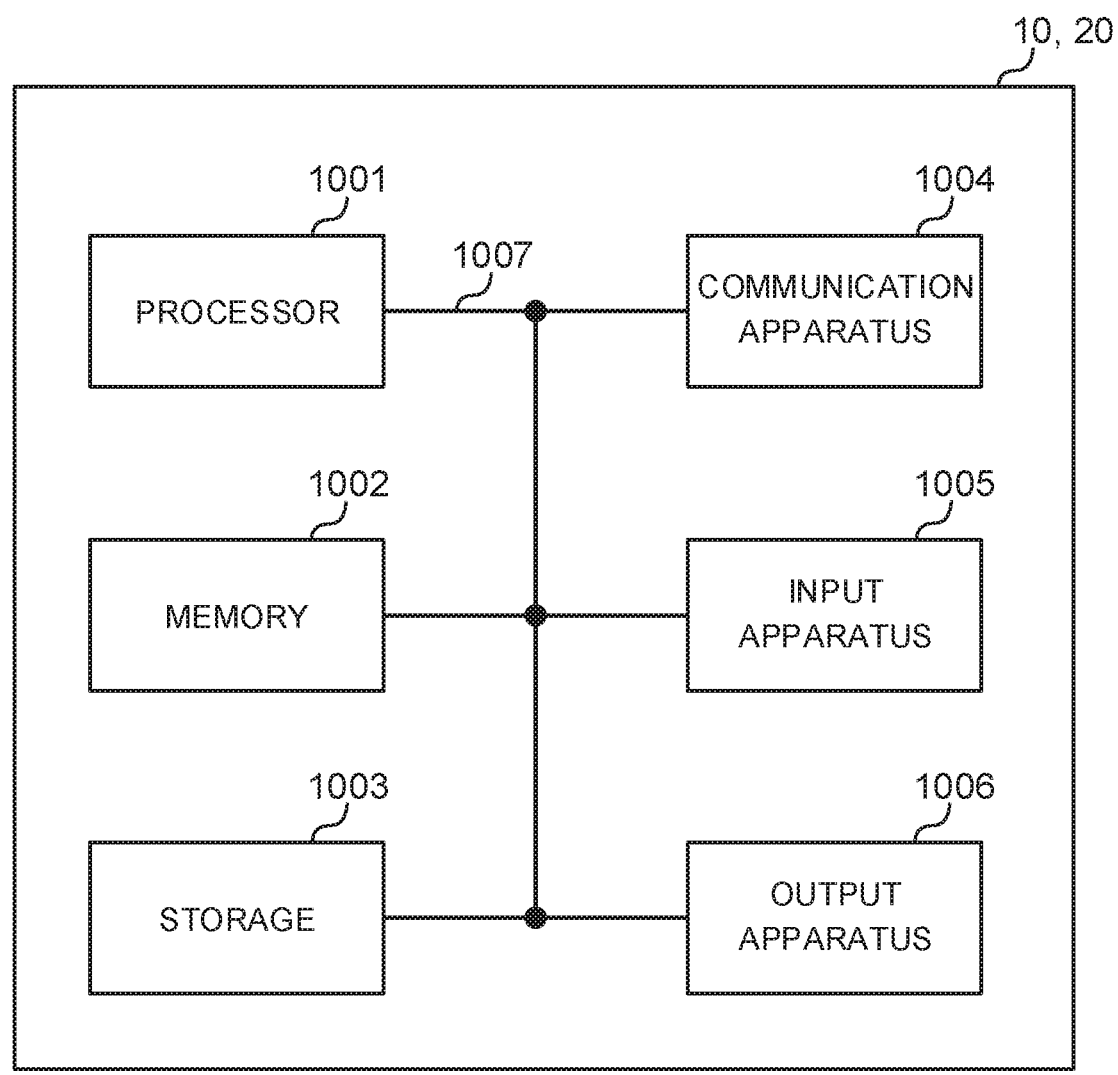
FIG. 28 is a diagram to show an example hardware structure of a radio base station and a user terminal according to the present embodiment.

For example, the radio base station, user terminals and so on according to one embodiment of the present invention may function as a computer that executes the processes of the radio communication method of the present invention. FIG. 28 is a diagram to show an example hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

Variations

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of minislots. Each minislot may consist of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or minislot may be referred to as a "TTI." That is, a subframe, and/or a TTI may be a subframe (one ms) in existing LTE, may be a shorter period than one ms (for example, one to thirteen symbols), or may be a longer period of time than one ms. Note that the unit to represent the TTI may be referred to as "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini slot is referred to as a "TTI," one or more TTIs (that is, one or more slots or one or more minislots) may be the minimum time unit of scheduling. Also, the number of slots (the number of minislots) to constitute this minimum time unit of scheduling may be controlled.

A TTI having a time duration of one ms may be referred to as a "normal TTI" (TTI in LTE Rel. 8 to 12) a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," a "PRB pair," an "RB pair" and so on.

Furthermore, a resource block may be comprised of one or more resource elements (REs). For example, one RE may be a radio resource region of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBS) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or less technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

Note that each aspect/embodiment described herein may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Global System for Mobile communications) (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other appropriate radio communication technologies, and/or may be applied to next-generation systems that are enhanced base on these radio communication technologies.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave regions and optical (both visible and invisible) regions.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-215567, filed on Nov. 2, 2016, including the specification, drawings and abstract, is incorporated herein by reference in its entirety.

The invention claimed is:

1. A terminal comprising:
a processor that determines a cyclic shift based on:
   a cyclic shift index that is based on a higher layer parameter and a downlink control information, and
   a first value associated with a second value of an uplink control information; and
a transmitter that transmits the uplink control information using a sequence defined by the cyclic shift,
wherein if the uplink control information is a 2 bit Hybrid Automatic Repeat reQuest-Acknowledgement (HARQ-ACK), then an interval of cyclic shifts corresponding to four values of the HARQ-ACK is $\pi/2$.

2. The terminal according to claim 1, wherein:
a cyclic shift corresponding to a value '01' of the HARQ-ACK is a sum of a cyclic shift corresponding to a value '00' of the HARQ-ACK and $\pi/2$;
a cyclic shift corresponding to a value '11' of the HARQ-ACK is a sum of a cyclic shift corresponding to the value '00' of the HARQ-ACK and $\pi$; and
a cyclic shift corresponding to a value '10' of the HARQ-ACK is a sum of a cyclic shift corresponding to the value '00' of the HARQ-ACK and $3\pi/2$.

3. The terminal according to claim 1, wherein the transmission of the uplink control information is over one symbol, and a bit number of the uplink control information is 2.

4. The terminal according to claim 1, wherein the cyclic shift index is terminal specific.

5. A radio communication method for a terminal comprising:
   determining a cyclic shift based on:
      a cyclic shift index that is based on a higher layer parameter and a downlink control information, and
      a first value associated with a second value of an uplink control information; and
   transmitting the uplink control information using a sequence defined by the cyclic shift,
   wherein if the uplink control information is a 2 bit Hybrid Automatic Repeat reQuest-Acknowledgement (HARQ-ACK), then an interval of cyclic shifts corresponding to four values of the HARQ-ACK is $\pi/2$.

6. A radio base station comprising:
   a receiver that receives an uplink control information using a sequence defined by a cyclic shift; and
   a processor that determines a value of the uplink control information based on:
      a cyclic shift index based on a higher layer parameter and a downlink control information, and
      the cyclic shift,
   wherein if the uplink control information is a 2 bit Hybrid Automatic Repeat reQuest-Acknowledgement (HARQ-ACK), then an interval of cyclic shifts corresponding to four values of the HARQ-ACK is $\pi/2$.

7. The radio base station according to claim 6,
   wherein the processor generates a plurality of signals corresponding to a plurality of values of the uplink control information, respectively, and
   wherein the processor determines the value of the uplink control information that corresponds to a received signal based on a correlation between the received signal and the plurality of signals.

8. The terminal according to claim 2, wherein the transmission of the uplink control information is over one symbol, and a bit number of the uplink control information is 2.

9. The terminal according to claim 2, wherein the cyclic shift index is terminal specific.

10. The terminal according to claim 3, wherein the cyclic shift index is terminal specific.

11. The terminal according to claim 8, wherein the cyclic shift index is terminal specific.

* * * * *